(12) United States Patent
Ramakrishnan et al.

(10) Patent No.: US 11,128,931 B2
(45) Date of Patent: Sep. 21, 2021

(54) SYSTEMS AND METHODS FOR CUSTOMIZING DELIVERY OF ADVERTISEMENTS

(71) Applicant: Rovi Guides, Inc., San Jose, CA (US)

(72) Inventors: Parasuraman Ramakrishnan, Boston, MA (US); Michael A. Montalto, South Hamilton, MA (US); Pok-Ching Lee, Waltham, MA (US); Wendy Cheang, Charlestown, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/933,018

(22) Filed: Jul. 20, 2020

(65) Prior Publication Data

US 2021/0044873 A1  Feb. 11, 2021

Related U.S. Application Data

(63) Continuation of application No. 16/510,309, filed on Jul. 12, 2019, now Pat. No. 10,750,249, which is a
(Continued)

(51) Int. Cl.

| | |
|---|---|
| *H04N 21/81* | (2011.01) |
| *H04N 21/258* | (2011.01) |
| *H04N 21/278* | (2011.01) |
| *H04N 21/231* | (2011.01) |
| *H04N 21/482* | (2011.01) |
| *G06Q 30/02* | (2012.01) |
| *H04N 21/4788* | (2011.01) |
| *H04N 21/84* | (2011.01) |
| *G06Q 50/00* | (2012.01) |

(Continued)

(52) U.S. Cl.
CPC .......... *H04N 21/812* (2013.01); *G06F 16/43* (2019.01); *G06F 16/438* (2019.01); *G06Q 30/0277* (2013.01); *G06Q 50/01* (2013.01); *H04N 21/23106* (2013.01); *H04N 21/23424* (2013.01); *H04N 21/25891* (2013.01); *H04N 21/278* (2013.01); *H04N 21/44222* (2013.01); *H04N 21/458* (2013.01); *H04N 21/4788* (2013.01); *H04N 21/4821* (2013.01); *H04N 21/84* (2013.01)

(58) Field of Classification Search
CPC .......... H04N 21/812; H04N 21/23106; H04N 21/23424; H04N 21/25891; H04N 21/278; H04N 21/4788; H04N 21/4821; H04N 21/84; H04N 21/458; H04N 21/44222; G06F 16/43; G06F 16/438; G06Q 30/0277; G06Q 50/01
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| (Continued) | | |

*Primary Examiner* — John R Schnurr
(74) *Attorney, Agent, or Firm* — Haley Guiliano LLP

(57) ABSTRACT

When a viewer is determined to be interested in an advertisement, a media guidance application may identify a second related advertisement to display to the viewer. The second advertisement may be displayed following the first interesting advertisement. To avoid timing issues, media content following the advertisements may be buffered so that the viewer can catch up on the media content without missing anything.

20 Claims, 13 Drawing Sheets

Related U.S. Application Data continuation of application No. 16/180,650, filed on Nov. 5, 2018, now Pat. No. 10,924,814, which is a continuation of application No. 15/897,296, filed on Feb. 15, 2018, now Pat. No. 10,154,319.

(51) Int. Cl.
*H04N 21/234* (2011.01)
*G06F 16/43* (2019.01)
*G06F 16/438* (2019.01)
*H04N 21/458* (2011.01)
*H04N 21/442* (2011.01)

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,504,486 B1* | 8/2013 | Pinto | G06Q 30/0631 705/347 |
| 9,009,066 B2 | 4/2015 | Long | |
| 9,258,606 B1 | 2/2016 | Collins et al. | |
| 2002/0165937 A1* | 11/2002 | Nitta | G06F 40/103 709/217 |
| 2002/0174430 A1 | 11/2002 | Ellis et al. | |
| 2003/0067554 A1 | 4/2003 | Klarfeld et al. | |
| 2003/0093784 A1 | 5/2003 | Dimitrova et al. | |
| 2005/0251827 A1 | 11/2005 | Ellis et al. | |
| 2006/0143067 A1* | 6/2006 | Calabria | G06Q 30/0641 705/26.1 |
| 2008/0276272 A1* | 11/2008 | Rajaraman | H04N 21/44016 725/37 |
| 2008/0297669 A1 | 12/2008 | Zalewski et al. | |
| 2009/0172728 A1 | 7/2009 | Shkedi et al. | |
| 2010/0095317 A1 | 4/2010 | Toebes et al. | |
| 2010/0153885 A1 | 6/2010 | Yates | |
| 2010/0198982 A1 | 8/2010 | Fernandez | |
| 2011/0099069 A1 | 4/2011 | Hoelz et al. | |
| 2011/0276993 A1 | 11/2011 | Ferguson | |
| 2011/0282745 A1 | 11/2011 | Meoded et al. | |
| 2012/0047529 A1 | 2/2012 | Schultz et al. | |
| 2012/0192227 A1 | 7/2012 | Fleischman et al. | |
| 2012/0253920 A1 | 10/2012 | Yarvis et al. | |
| 2013/0132996 A1* | 5/2013 | Wu | H04N 21/812 725/32 |
| 2013/0205314 A1 | 8/2013 | Rannaswanny et al. | |
| 2013/0298158 A1 | 11/2013 | Conrad et al. | |
| 2014/0282647 A1 | 9/2014 | Hardy | |
| 2014/0337868 A1 | 11/2014 | De la Garza et al. | |
| 2015/0026718 A1* | 1/2015 | Seyller | H04N 21/4725 725/34 |
| 2015/0296258 A1 | 10/2015 | Morten | |
| 2016/0063318 A1 | 3/2016 | Cheatham et al. | |
| 2017/0131851 A1* | 5/2017 | Thompson | H04N 21/2665 |
| 2017/0230729 A1 | 8/2017 | Piard et al. | |
| 2018/0020247 A1 | 1/2018 | Zhang | |
| 2019/0299108 A1* | 10/2019 | Andall | A63F 13/31 |

* cited by examiner

600

| Program | Time | Metadata | |
|---|---|---|---|
| Broadcast 1 (612) | 7:31 - 7:36 (622) | | 632 |
| Commercial Break (614) | 7:37 - 7:42 (624) | Ad 1 : 7:37:00 - 7:37:46<br>Ad 2 : 7:37:47 - 7:39:46<br>Ad 3 : 7:39:47 - 7:41:15<br>Ad 4 : 7:41:16 - 7:42:00 | 634 |
| Broadcast 2 (616) | 7:42 - 7:57 (626) | | 636 |

1300

1301
Access with Control Circuitry, Media Content with User Equipment.

1305
Determine with Control Circuitry, a Timestamp for a Commercial Break Time Period for the Media Content and an Associated Plurality of Advertisements for Display in the Commercial Break Time Period 1310
Display on the User Equipment, an Advertisement of the Plurality of Advertisements 1315
Detect with Control Circuitry that a Viewer is Watch One of Plurality the Advertisements During the Commercial Break Time Period 1320
Determine with Control Circuitry a Time that the Viewer is Watching One of the Plurality of Advertisements During the Commercial Break 1325
Identify with Control Circuitry the One of the Plurality of Advertisements Being Watched by the Viewer Using the Time and the Timestamp for the Commercial Break Time Period 1330
Retrieving with Control Circuitry Metadata Associated with the One of the Plurality of Advertisements to Identify a Characteristic

SYSTEMS AND METHODS FOR CUSTOMIZING DELIVERY OF ADVERTISEMENTS

CROSS REFERENCE TO RELATED APPLICATION

This application is a continuation of U.S. patent application Ser. No. 16/510,309, filed Jul. 12, 2019, which is a continuation of U.S. patent application Ser. No. 16/180,650, filed Nov. 5, 2018, which is a continuation of U.S. patent application Ser. No. 15/897,296, filed Feb. 15, 2018, now U.S. Pat. No. 10,154,319, which are hereby incorporated by reference herein in their entireties.

BACKGROUND

Advertisements are commonly presented to a media viewer when the viewer is viewing the media. Sometimes, the advertisements are selected for display using information about the viewer. Other times, advertisements are selected for display using general viewer demographics information for the media. In either scenario, it can be difficult to know if the viewer is actually watching an advertisement or if the viewer is interested in the advertisement. Supplying advertisements that a viewer wishes to see can improve the impact of the advertising on the viewer.

SUMMARY

Accordingly, systems and methods are described for optimizing delivery of advertisements for a media viewer. When a viewer watches media content, advertisements may be viewed by the viewer. An advertisement holding a viewer's interest may be particularly suitable for the viewer. A media guidance application may be used to determine that a viewer is watching a particular advertisement. The media guidance application may then identify a related or similar advertisement that may be suitable or interesting to display to the viewer following the advertisement that the viewer was determined to have watched. Providing a second advertisement to the viewer that is related to one that the viewer was interested in can be helpful for the viewer, and also provide increased promotional impact for the advertiser by targeting an interested viewer. In some scenarios, the advertisements may be part of a group of advertisements scheduled for display during a commercial break. Since adding an additional advertisement may encroach into the time for the media content to restart, the media guidance application may buffer the media so that the viewer does not miss any of the content of the media that the viewer was watching.

In an illustrative example, a viewer may view any type of media content. The media content may have a commercial break interval during which one or more advertisements may be presented to the viewer. One of the advertisements may be related to an automobile. The automobile advertisement may be one of interest to the viewer and so the viewer may watch the advertisement. A media guidance application may detect that the viewer is watching the automobile advertisement based on, for example, a viewer interaction with the media guidance application or other device. For example, a viewer may search a product, actor, or social media associated with the advertisement. In some scenarios, a lack of interactions with the media guidance application may also be indicative of a viewer watching an advertisement. For example, if a viewer does not change channels or search for other content during an advertisement, the media guidance application may determine that the viewer is watching the advertisement.

When the media guidance application determines that the viewer is watching the advertisement, the media guidance application may seek out information about the advertisement such as characteristics about the advertisement using metadata associated with the advertisement. The media guidance application may obtain the metadata from an advertisement database or content database, or another source. The characteristics about the advertisement may be used by the media guidance application to search for other similar or related advertisements. In the automobile advertisement example, characteristics in the metadata may include a geographic location, automobile company, product information, car type, target demographic information and other advertising details. The media guidance application may select one or more of the characteristics to search an advertisement database for a similar advertisement. In addition, the media guidance application may use user profile information about the viewer to select a particularly suitable or relevant advertisement to show the viewer.

The similar advertisement may then be displayed for the viewer following the advertisement that the viewer watched. Timestamps for the advertisements may be used to buffer media content so that when a commercial break interval ends, the viewer does not miss any of the media content that the viewer was watching.

In an example, a display of advertisements may be customized for a viewer. A viewer may access media content with user equipment. The media content may be any type of media content that is accessible to the user. Features described herein may be suitable for real-time broadcasts of media content such as sporting events and first-run media content, but may be applied to any type of media content that has a commercial break or advertising interval.

During a commercial break time period for the media content, one or more advertisements may be displayed on the user equipment for the viewer. A media guidance application may be used to detect that the viewer is watching an advertisement. Detection that the viewer is watching the advertisement may include monitoring the viewer for interactions with the media content using the user equipment, the media guidance application or a device. For example, a media guidance application may determine that the viewer is viewing the advertisement when a viewer is not changing a channel, using a fast forward/rewind feature, or pausing a commercial. In another example, a media guidance application may determine that the viewer is viewing the advertisement when the viewer searches for content related to the advertisement. For example, the viewer may use a connected household device to perform an Internet search for a product included in the advertisement or an actor in the advertisement, or another search. In another example, the viewer may access a product page or social media page for a product included in the advertisement using a device that is connected to the media guidance application.

When the media guidance application determines that the viewer is watching the advertisement, the media guidance application may retrieve metadata associated with the advertisement to identify a characteristic of the advertisement. The metadata for the advertisement may be obtained from an advertising database or a media database. The metadata may include various types of information about the advertisement including, for example, a geographic location, company or business, product information, target demographic information and other advertising details. The media guidance application may use the advertisement characteristics to find a related advertisement. For example, the media guidance application may select one or more characteristics of the advertisement and search an advertising database to identify another similar advertisement. The media guidance application may then display the similar advertisement following the advertisement that was determined to have been watched by the viewer. Thus, a viewer may view a second advertisement that is similar to one the viewer has already watched. Since adding the second advertisement may cause the advertising period to exceed a commercial break time period, the media guidance application may buffer the media content, while the second advertisement is presented, so that the viewer does not miss any content.

In another illustrative example, a display of an advertisement may be customized for a viewer. The viewer may access media content. The media content may have advertising intervals, such as a commercial break time period, that may occur during the media content. A timestamp for the commercial break may be determined using control circuitry of a media guidance application. The commercial break timestamp information may be obtained, for example, using metadata associated with the media content or from the media content source. The commercial break may also have scheduled or designated advertisements to be displayed during the commercial break time period. The media guidance application may obtain respective timestamp information for each advertisement that may be scheduled or included in the commercial break time period. Advertisements may be displayed for a viewer during the commercial break time period according to a schedule, for example, showing each advertisement at its respective scheduled time.

The media guidance application is capable of, among other things, receiving viewer interactions from the viewer during delivery of the media content and the commercial break time period. For example, the media guidance application may receive viewer inputs to change a channel, view media information, record the media, or other inputs. During the commercial break time period, the media guidance application may receive an input from the viewer to, for example, change a channel or launch a picture-in-picture window for other media, so that the viewer can see other media during the commercial break time period. Such inputs would typically indicate that the viewer is not interested in viewing advertisements. The media guidance application could also receive viewer interactions that indicate that the viewer is interested in viewing an advertisement. In one example, the media guidance application could receive no viewer inputs while an advertisement is displayed. A lack of inputs from the viewer could mean that the viewer is interested in the displayed advertisement and is watching it. In another example, the media guidance application could receive an input from the viewer that is related to the advertisement, for example, the viewer could select an option included in the advertisement to access product information, the viewer could search for product information in a connected device, or perform other input. Such inputs may indicate that the viewer is interested in the advertisement being viewed. The media guidance application control circuitry may monitor viewer interactions on a viewer's user equipment or personal device, a household device of the user, and also accessible social networks for the viewer. For example, the media guidance application may monitor viewer interactions during an advertisement that may occur in a Google Home or Amazon Echo device, or in a viewer's social media (for social media to which the media guidance application has access), or on a viewer's smartphone or other device.

Such viewer interactions may be used by the media guidance application control circuitry to detect that the viewer is watching one of the advertisements during the commercial break time period. Such interactions and types of interactions could also be used to infer an indication that the viewer is interested in the advertisement. In such cases, the media guidance application may seek a second similar advertisement to show the viewer.

To find the second advertisement, the media guidance application may first determine what advertisement was interesting to the user by determining a time that the viewer was watching the advertisement. Using the commercial break timestamp information, the media guidance application may match the viewing time with the timestamp to identify a respective advertisement. Metadata about the advertisement may be retrieved by the media guidance application from an advertisement database to obtain information and characteristics about the advertisement. For example, product information, target demographics, brands, company information, geographic locations, or other characteristics may be determined for the advertisement from its metadata. One or more of the characteristics may be used as a basis for searching an advertising database to find another similar related advertisement having the characteristic or characteristics. The second advertisement may be selected to be displayed for the viewer following the advertisement. Since the addition of another advertisement may exceed the time allotted to the commercial break time period, the media guidance application may buffer, in a media cache, the media content so that the viewer does not miss any content.

Selection of the second related advertisement may have several steps that may be performed in various combinations or orders. In one example, the second advertisement may be selected based in part on a type of viewer interaction. For example, if a viewer is not interacting with the media guidance application and is not changing a channel or seeking to fast-forward through an advertisement, such passive types of interactions may indicate a general interest in the advertisement. In such case, the media guidance application may select a characteristic of a product referred to in the advertisement, for example. The media guidance application could also use a viewer's user profile to identify preferences or interesting product categories for the viewer and if there is overlap between the user profile and the advertisement characteristics, an overlapping characteristic could be used to identify the second advertisement. In another example, if the media guidance application detects a viewer interaction that is related to, for example, searching for character information about an actor in the advertisement, the media guidance application may seek a second advertisement that includes the actor.

In some scenarios, a lack of a user interaction with a media guidance application during a commercial break time period could also indicate that a user is not paying attention to the advertising display. For example, the user may be resting or performing other activities during the commercial break time period. In order to avoid misconstruing the viewer's interest when the viewer is not interacting with the media, the media guidance application may search an advertising database to identify popularity metrics for the advertisements in the commercial break time period. A threshold of popularity may be set as a benchmark so that only relatively popular advertisements could be considered interesting to the viewer when the viewer does not interact with the media guidance application during the advertisement display.

In some examples, information from a viewer's social network may be used to further customize an advertisement display. The media guidance application may search a viewer's social media to find instances of posts or shares that relate to advertising that can be included in an overlay over the advertising display. For example, the media guidance application may search a viewer's social media posts and posts by friends of the viewer to find a share of an advertisement or a mention of a product related to the advertisement. That post, or some portion of the post, may be quoted and included in an overlay over the display of the advertisement. Attribution or identification of the person (specifically or generically) that shared the advertisement or commented on the advertisement product may also be included in the overlay so that the viewer may see the source of the quote.

In some examples, reviews about a product included in an advertisement may also be included in an overlay over the advertising display. Metadata for a related or second advertisement may be searched by a media guidance application to identify a product associated with the advertisement. A product database or product source may be searched to find reviews about the product. A comment from the reviews may be selected to include in an overlay shown over the advertisement display. The comment from the review may be selected using one or more factors. For example, some product reviews may have likes or favorable ratings, some reviewers may also have favorable ratings, or a reviewer may be identified as being known to a viewer (for example by using social media account details). In another example, a product review may be selected based on a rating of the product. In order to find a typical average review, the media guidance application may determine an average rating for a product, such as 3 out 5 stars, and then select a review that has the same rating—e.g., 3 out of 5 stars. In addition, a comment selected from a rating to be added in an overlay may need to be a limited number of words given the size of the overlay in the display. Thus, a comment may be selected based on length. Alternatively, a comment may be selected using a title for a rating. Such examples may be used together or separately, in various combinations.

In some examples, a viewer may wish to share an advertisement that they have viewed. In such case, the media guidance application may identify a friend of the viewer, using a social network of the viewer, and check the friend's viewing history to determine whether the friend has viewed the advertisement. If the friend has not viewed the advertisement, the media guidance application may generate an option for display at the end of the advertisement that the user may select to share the advertisement with the friend. The friend may be suggested by the media guidance application based on, for example, frequency of communications and shares between the viewer and the friend, a friend's user profile indicating interest in a concept associated with the advertisement, or another factor.

In some examples, when a second or related advertisement is selected to show a viewer, a portion of the second advertisement may be shown, rather than the entire advertisement. The portion of the second advertisement may be selected by searching a social network for the viewer for any posts that are related to the advertisement. If the advertisement is included in the social network post, the media guidance application may determine what portion of the advertisement was included in the post. For example, a screenshot or clip of the advertisement may be included in the post rather than the entire advertisement. The media guidance application may select the same portion of the advertisement to display to the viewer. In another example, the media guidance application may search an advertising database to determine whether any clips of the advertisement exist and use such clip if available.

In some scenarios, the addition of advertisements for a viewer may not be welcome, particularly if the added advertisement is not particularly interesting to the viewer. To help ensure that an advertisement selected for a viewer is one that is likely to be interesting to the viewer, the pool of potential advertisements may be limited. For example, the source of the advertisements may be a database that collects a set of advertisements that may be connected or related to the viewer. Some examples of advertisements may be those that are associated with a contact in the viewer's social network, recommended by a contact in the viewer's social network, associated with a geographical region associated with the viewer, and to have a popularity metric that exceeds a threshold.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
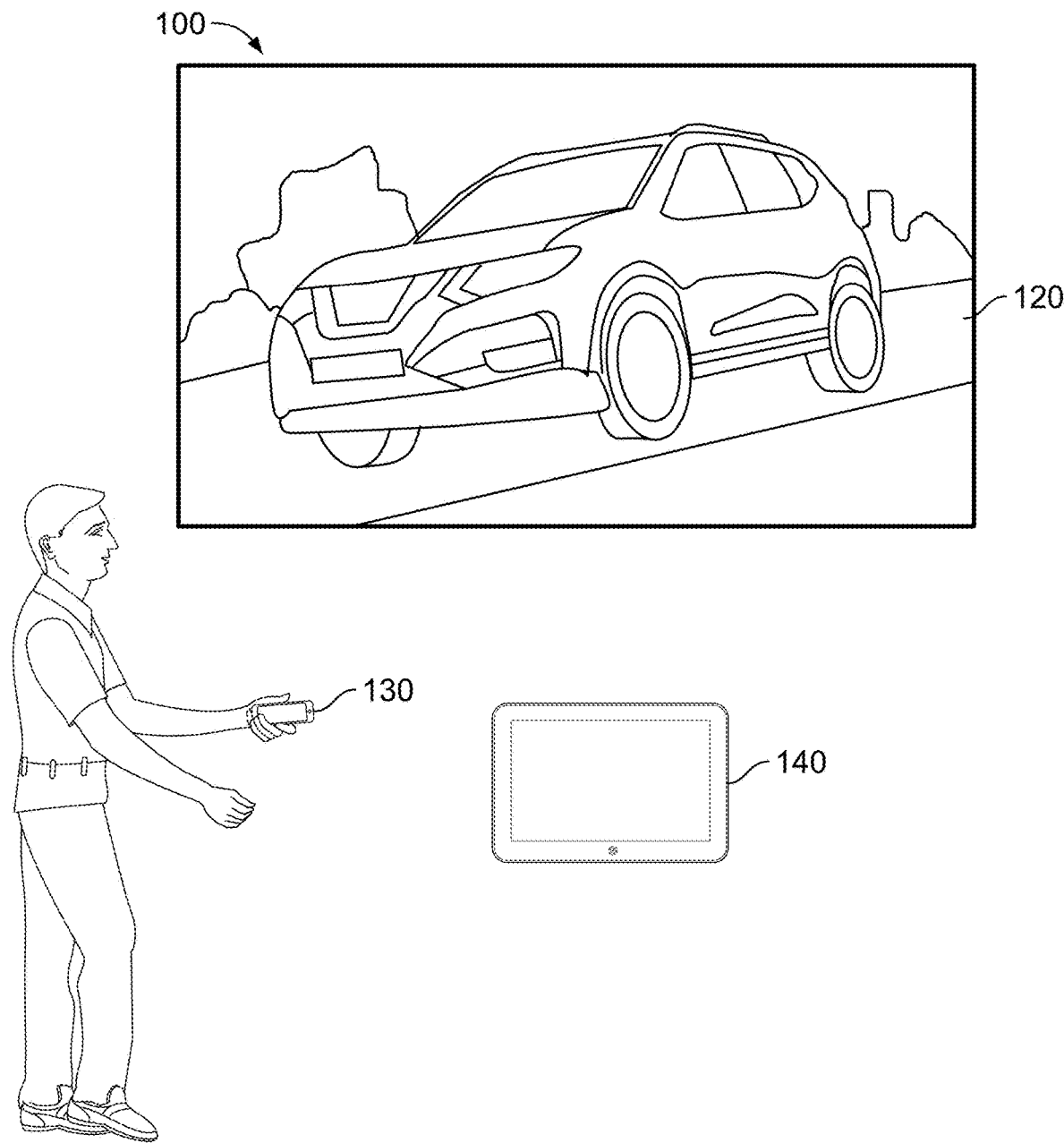
FIG. 1 shows an illustrative example of an advertisement being displayed in a screen generated by a media guidance application in accordance with some embodiments of the disclosure.

Accordingly, systems and methods are described herein for enhancing a viewer's media consumption experience by presenting a customized advertisement for the viewer. In particular, when a viewer is determined to be interested in one advertisement, a second related advertisement may be shown to the viewer. The second related advertisement may be displayed with additional information that may be useful or relevant to the viewer.

In an example, a viewer may access media content that has a commercial break interval. The media content may be any type of media content that includes an advertisement that is shown during the media content. For example, the media content may be a scheduled program, such as a sporting event or first-run program, that is broadcast or available at a certain time. The media content may also be delivered on demand from a streaming source. During the media content delivery, an advertising interval may occur when one or more advertisements may be displayed to a viewer. In general, viewers may treat advertisements in different ways. Some viewers may use an advertising interval to stand up and take a break from viewing, other viewers may look away from the media display screen, and yet other viewers may actually view the advertisements. If the viewer is one that views the advertisements, it would be helpful to advertisers to capture the viewer's interest and supply advertising that is relevant to the viewer. A media guidance application may be used to monitor a viewer during a display of advertising. If the media guidance application detects that the viewer is watching an advertisement, adding an additional related or relevant advertisement to an advertising lineup may be helpful to the viewer, and may also present an advertiser with a more targeted advertising opportunity.

To provide such a customized advertising experience, the media guidance application may monitor a viewer for indications that the viewer is watching an advertisement. Different types of interactions with user equipment and the media guidance application, as well as with household devices, may indicate whether the viewer is watching an advertisement. For example, if a viewer is watching media content on a tablet or smartphone, if the viewer changes orientation of the device during the advertisement period, such action may be detected using a gyroscope in the device and may indicate that the viewer has laid the device on a table or set it to the side, and such interaction would indicate that the viewer is not watching the advertisement. In another example, a viewer may watch the media content on a television and during a commercial break, seek to change a channel or launch a picture-in-picture window to view another channel. These are also examples of a viewer not watching the advertisement. In another example, a viewer may watch the media content on a television and, during the commercial break, the viewer may keep the television on and not change the channel or the television display. Such actions, or rather, lack of actions, may indicate that the viewer is watching the advertisement. In the same example, if the viewer is watching the advertisement, the viewer may use a second device, such as a tablet or smartphone, to check for information about the advertisement they are viewing. For example, if a movie advertisement is being displayed, a user may search a movie listings website to determine a showtime for a nearby cinema. Such a search could be detected by the media guidance application and be used to determine that the user is interested in the movie advertisement. In another version of the example, a viewer may watch an advertisement for a food item and while the advertisement is being displayed, the viewer may wish to purchase the food item and search for it on a tablet or smartphone, or ask a home assistant device to add it to a shopping list. The media guidance application could detect such user interactions and determine that a user is interested in the advertisement.

When user interest in an advertisement is determined by the media guidance application, the media guidance application may search for a similar second advertisement to show the viewer. In order to find a suitable second advertisement, the media guidance application will seek information about the first advertisement. To identify the first advertisement, the media guidance application may determine a time that the viewer was watching the advertisement and check a record of the media content and determine timestamps for advertisements displayed in the commercial break. Then, the media guidance application may seek details about the advertisement, such as a metadata record from an advertising database to find characteristics about the advertisement. Some characteristics could be product type, geographical targets, demographics, actors, or other characteristics. The media guidance application may then search an advertising database to identify a second advertisement that has a common characteristic. The second advertisement may be displayed to the viewer with overlays of information such as comments from a viewer's friends that are found on the viewer's social network, or product reviews from product databases. The second advertisement may also be presented with an option to share the advertisement with a friend.

If the media content is one that is scheduled, meaning that it has a certain delivery time, the addition of an advertisement may exceed the commercial break time period and cause the viewer to miss some of the media content that begins after the commercial break. To avoid missing the media content, the media guidance application may buffer a portion of the media content in a cache so that the media content may be played for the viewer starting at the portion that would have followed the commercial break.

Generally speaking, media content as used herein may include various types of media programming, such as television, movies, podcasts, or other media. Advertisements and commercials can also be considered media content in certain contexts. And the use of promotional components in entertainment can sometimes difficult to distinguish between an entertainment program and an entertaining promotional piece. Advertisements and commercials are meant to relate to content that is created primarily to promote goods and services, and that is inserted into media programs at certain intervals.

Turning to FIG. 1, a viewer may view media content on a television screen 100. During the media content, there may be one or more commercial break intervals during which an advertisement may be displayed for the viewer. For example, an advertisement for a vehicle 120 may be displayed to the viewer. The viewer may also watch the media content on a smartphone 130 or a tablet 140. The smartphone 130 or tablet 140 may also be used by the viewer to find out information about the display shown on television 100. For example, during a display of the media content, the viewer may use the tablet 140 to find out information for an actor in the program. The viewer may also have a remote control device that is used to control the television display. A media guidance application may be used by the viewer in connection with the display of the media content. The media guidance application may be used to select the media content, for example, that is displayed on the screen 100. The media guidance application may also be used to change a channel on the screen 100 or perform other media-related functions. The media guidance application may monitor the viewer's interactions with the media guidance application and other connected devices in the household, such as smartphone 130 and table 140, and also home assistants (not shown), or other connected devices, during the display of the media content and advertisements.

Monitoring of the viewer by the media guidance application can include, for example, monitoring the viewer for media interactions with the display on screen 100. For example, a viewer may change a channel, select an object or option in the display to purchase or record a program, or perform other interaction. The media guidance application may also monitor, if available, viewer devices such as the smartphone 130 and table 140. In some examples, the media guidance application may monitor the viewer's social network activity during media and advertising displays to determine whether the viewer is posting or sharing comments or items that are related to the display. Certain types of interactions with viewer devices and the media guidance application may indicate viewer interest in what is displayed on screen 100. For example, if a viewer is not changing a channel during an advertisement, such omission of interactions may indicate that the viewer is watching the advertisement. In another example, the viewer may search for information about a product in the advertisement. Such actions would indicate viewer interest in the advertisement 120 displayed in screen 100. If such interest is detected by the media guidance application, the media guidance application may identify the advertisement and retrieve metadata about the advertisement. The metadata about the advertisement may be obtained from an advertising database and may supply characteristics and information about the advertisement. The characteristics may be used to find a second related advertisement to show the viewer.

Figure 2:
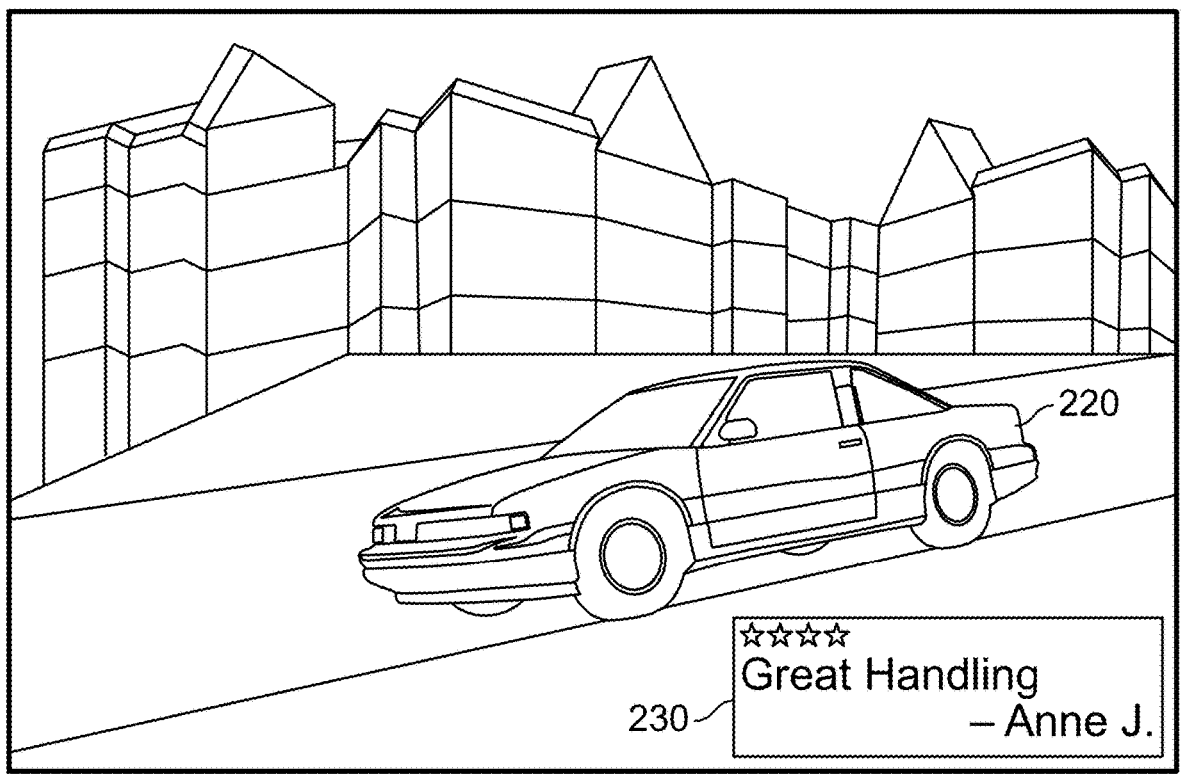
FIG. 2 shows an illustrative example of a customized advertisement displayed in a screen generated by a media guidance application in accordance with some embodiments of the disclosure.

Turning to FIG. 2, the second related advertisement may be shown on screen 200, which shows another vehicle advertisement 220. The second advertisement may be further customized for the viewer to include a review 230 that may be obtained from a source for a product included in the advertisement. The review 230 may be obtained by checking metadata for the second advertisement to determine a product associated with the second advertisement, then searching a source for the product and identifying a suitable review to include. The review may be selected by the media guidance application using one or more factors, such as a reviewer that is known to the viewer, e.g., one that is in the viewer's social network, or who has an identifier that matches a contact in the viewer's contact list; reliability or popularity of a review; or another factor. In another example, a review may be selected based on an average review for a product associated with the advertisement. In such example, the media guidance application could determine an average rating for the product in a product database and then search for a review having the same rating. For example, for a product having an average rating of 4.2 out of 5 stars, the media guidance application may seek a review that rates the product 4 out of 5 stars. In addition, or separately, the media guidance application may select a review of a certain length that would be suitable for the overlay in the display. The length may be based, for example, on an overall device screen size or window size for the overlay.

Figure 3:
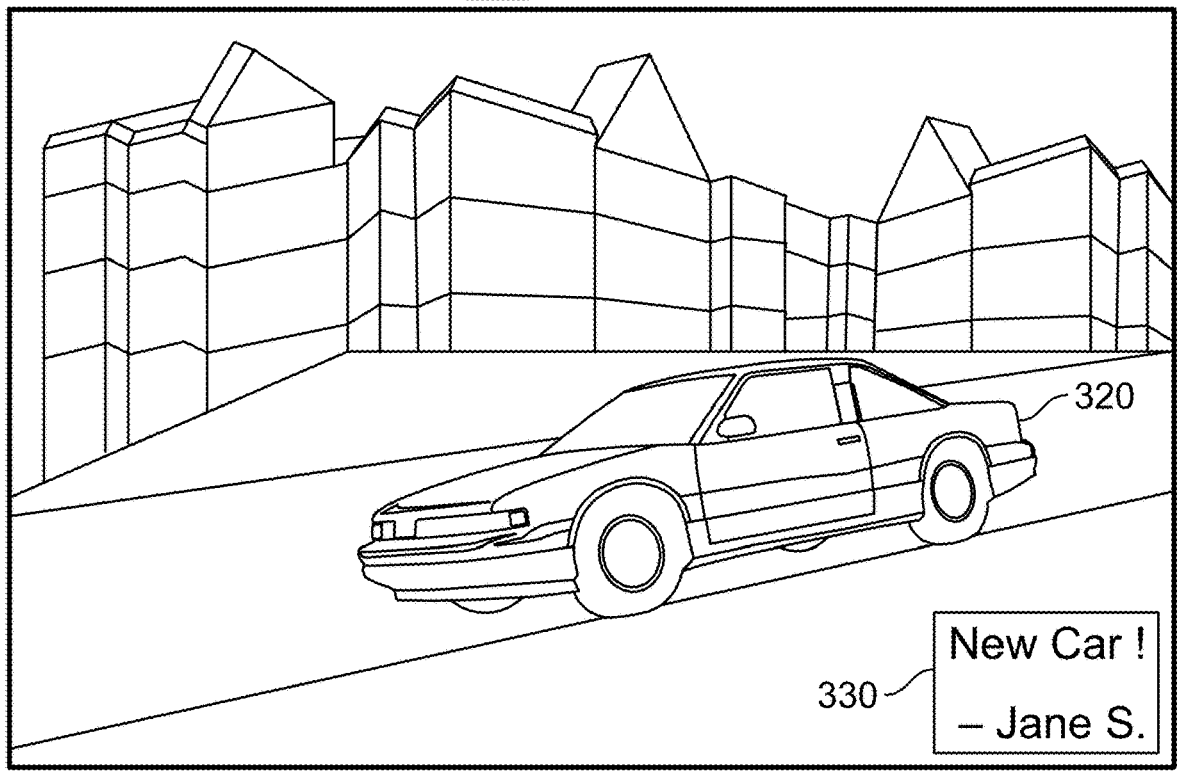
FIG. 3 shows another illustrative example of a customized advertisement displayed in a screen generated by a media guidance application in accordance with some embodiments of the disclosure.

In another example, turning to FIG. 3, the second related advertisement may be shown in a screen 300 showing the advertisement 320 and including a comment 330 that is obtained from a viewer's social network. The comment 330 may be obtained by checking metadata for the second advertisement to determine a product associated with the second advertisement, then searching the viewer's social media to find a post, tag, share, or comment about the product, and using the post in an overlay over the advertisement. If there are more than one matching comment for the product in the viewer's social media, a comment may be selected by the media guidance application using one or more factors, such as frequency of interactions between the viewer and the friend, overlap of interest by the viewer and the friend, or another factor.

Figure 4:
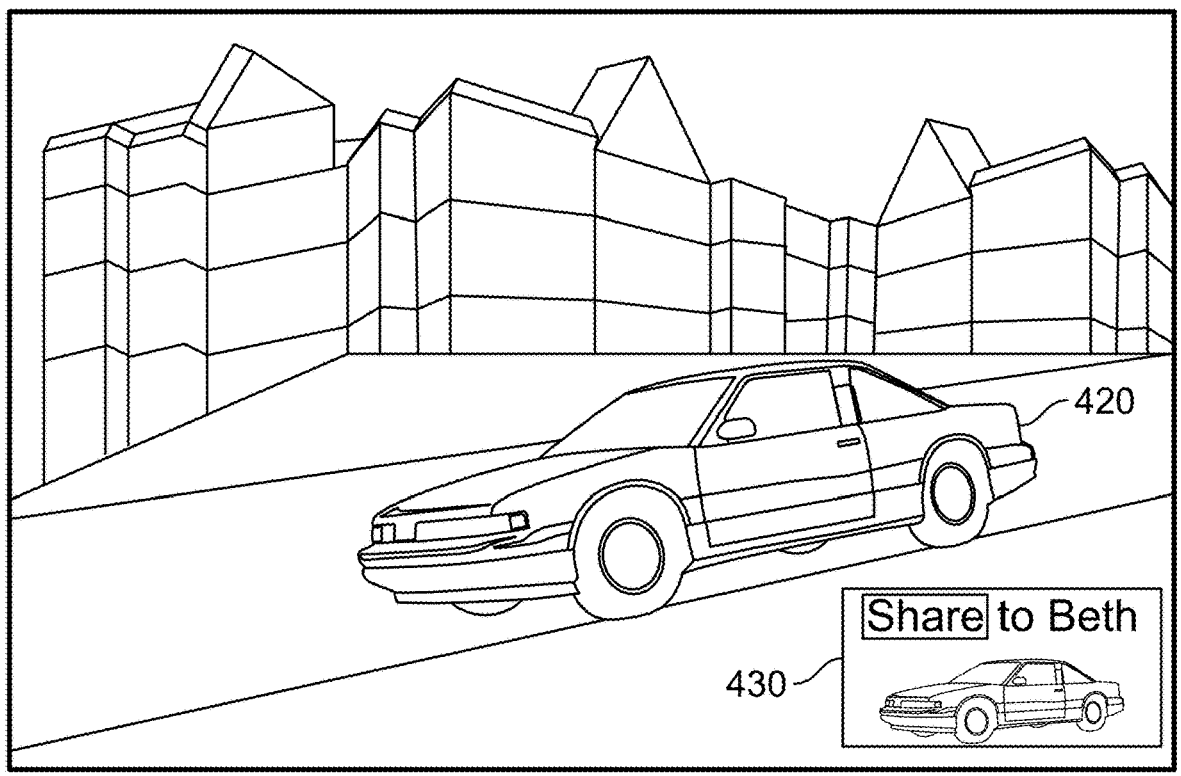
FIG. 4 shows another illustrative example of a customized advertisement displayed in a screen generated by a media guidance application in accordance with some embodiments of the disclosure.

In another example, turning to FIG. 4, the second related advertisement may be shown in a screen 400 that may include the advertisement 420 and a customized share option 430 for the viewer to share the advertisement with a friend. The share option 430 may be supplied by the media guidance application by identifying information about the second advertisement and then checking a friend's viewing history to determine whether the friend has viewed the second advertisement. In addition, the media guidance application may limit sharing to friends that have overlapping interests with the viewer and a product associated with the second advertisement, and additionally limit sharing to friends in a viewer's social network that have a certain number of sharing interactions between the viewer and the friend.

Figure 5:
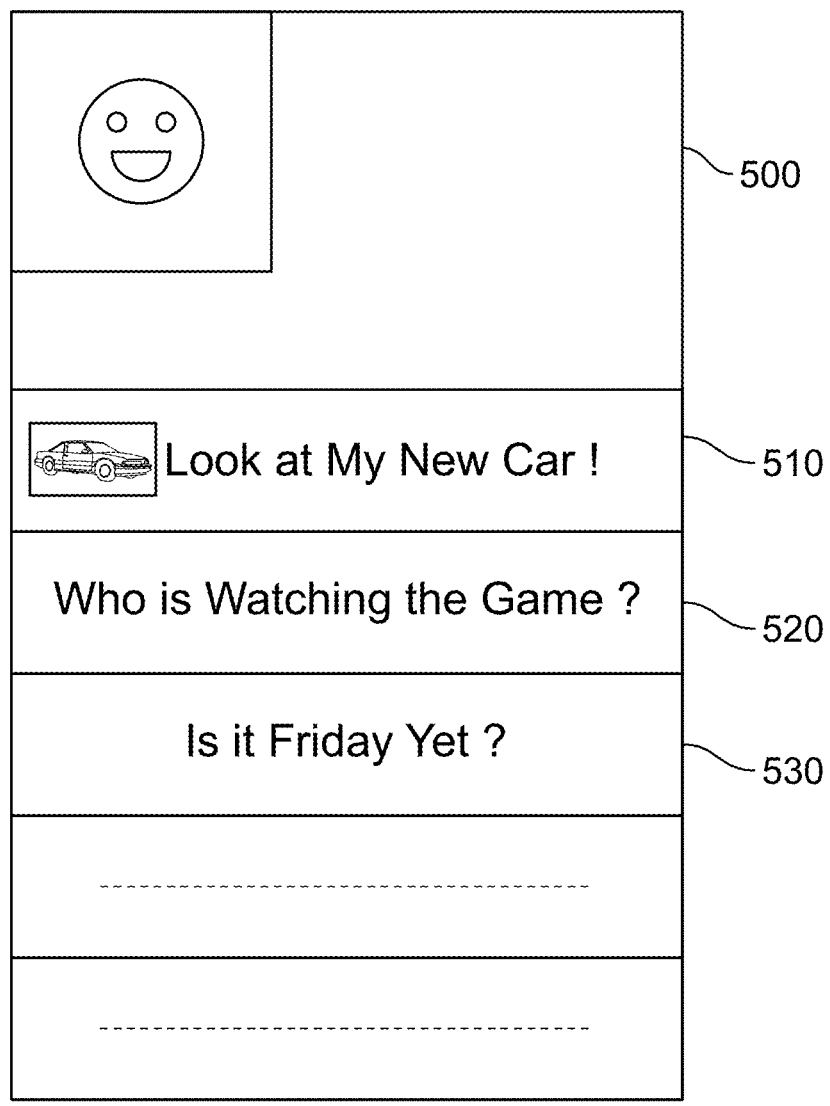
FIG. 5 shows an illustrative example of a social media page in accordance with some embodiments of the disclosure.

Social media information for the viewer may be obtained from a social media account for the viewer. A simplified version of a social media account may be that shown in FIG. 5, which includes a page 500 that includes various posts 510, 520 and 530. The posts may include, for example, a comment and image about a vehicle 510, comments about a sporting event 520, or other general comments 530. The viewer's social media may also include comments by friends of the viewer (not shown), and other shared information about members of the viewer's network. Such information may be used to supply user preferences for the viewer that may be used to customize an advertisement display. For example, the advertisement shown in FIG. 3 may include a portion of a post 510 in an overlay 330 (FIG. 3). In another example, the advertisement shown in FIG. 4 may include the share option 430 (FIG. 4) using friend information from the viewer's social network.

Figures 6, 7:
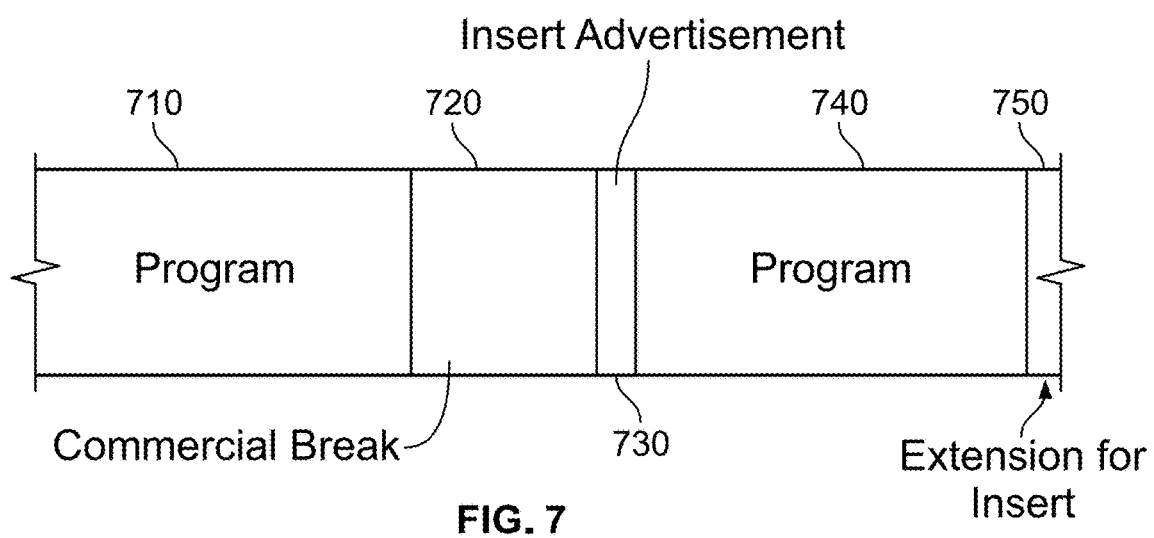
FIG. 6 shows an illustrative database record for a plurality of advertisements to be played at intervals between media content in accordance with some embodiments of the disclosure.
FIG. 7 shows an illustrative example of a timeline for displaying media content with a customized advertising interval in accordance with some embodiments of the disclosure.

Turning to FIG. 6, in order to identify an advertisement being displayed to a viewer, an illustrative media record 600 may be used to find timestamp details for the media content, a commercial break interval, and respective advertisements. As shown in record 600, information about a program 610, time 620 and metadata 630 may be stored in association. Program details 610 may include broadcast 1 612, a commercial break 614, and broadcast 2 616. Other portions of media content may also be included for a program 610. Such an example is meant to show that media content may be delivered or scheduled to have a commercial break interval 614 between portions of the media content, i.e., broadcast 1 612 and broadcast 2 616. A time 620 may be associated with each of the portions so that a broadcast 1 612 may be shown at time 622—7:31:00 to 7:36:00. The time may be a broadcast time, or an interval of time following a start time for the media content. Metadata 632 for the broadcast 1 612 may include various information about the media content at that time period specifically, and/or for the media content generally, such as media description, actors, plot lines, highlights, and other metadata. The commercial break 614 may be associated with a particular timestamp 624 and have associated advertisements 634 that may be stored with identifiers and metadata about the advertisements. For example, metadata 634 for each of the advertisements may include respective timestamps, and advertisement information, such as product types, categories, geographic targets, target demographics, product sources, actors, and other advertising information. Following the commercial time break 614, the media content may resume with a second portion of the content broadcast 2 616 which may occur at time 626 and which may have associated metadata 636 about the content. The time 620 may be used by the media guidance application to identify an advertisement that was viewed by a viewer. Then, knowing the time, the respective advertisement may be identified by the media guidance application using metadata 630. The metadata 630 may also be used by the media guidance application to find characteristics of the advertisement that can be a basis for a search for a second related advertisement.

Delivery timing for the media content may also be considered using the illustrative timeline shown in FIG. 7. As shown, media content may be displayed in a format that includes a first portion of a program 710 which is followed by a commercial break 720. If a media guidance application detects a viewer's interest in one of the advertisements shown in the commercial break, the media guidance application may identify a second advertisement to show the viewer. The second advertisement may be inserted into the media display at time 730. The second advertisement may be shown at a time after the advertisement of interest to the viewer, for example, immediately following the interesting advertisement, or later, such as at the end of the commercial break time period. Following the advertising displays, the media content may resume at 740. Since the second advertisement may cause a shift in timing for the resumed program, an extension of time 750 may be needed to account for the additional time. In addition, to avoid missing the resumed media following the added second advertisement, the media guidance application may buffer a portion of the media content for a time period based on the length of the second advertisement.

The media content timeline 700 would differ from an original timeline schedule, which would omit an additional inserted advertisement 730 and corresponding the extension 750. Thus, a media content timeline without these portions would have program 710, then a commercial break 720, followed by program 740. Of course, further commercial breaks and programming intervals could continue on such media content timeline.

In some scenarios, it may be preferable to present a second related advertisement at a later time. In this example, as advertisements are being determined to be viewed by a viewer, the media guidance application may identify a second related advertisement. The second advertisement may be stored in an advertisement playlist. Third, fourth, and further advertisements may be added to the same playlist based on advertisements that are determined to be of interest to a viewer. The media guidance application may present a guide screen on a user device that includes an option to see further supplemental advertisement. If a viewer selects one or more of the advertisements in the playlist using the guide screen interface, the additional advertisement may be played together with the original advertisement of interest, which was the basis for finding the additional advertisement. In this scenario, the media guidance application may buffer any media content programming which may have its timing affected by the addition of the supplemental advertising viewing so that the viewer can watch the media content without missing any of it.

Although the examples described with reference to FIGS. 1-7 have involved only vehicle advertisements, any type of advertisement could be used.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 8:
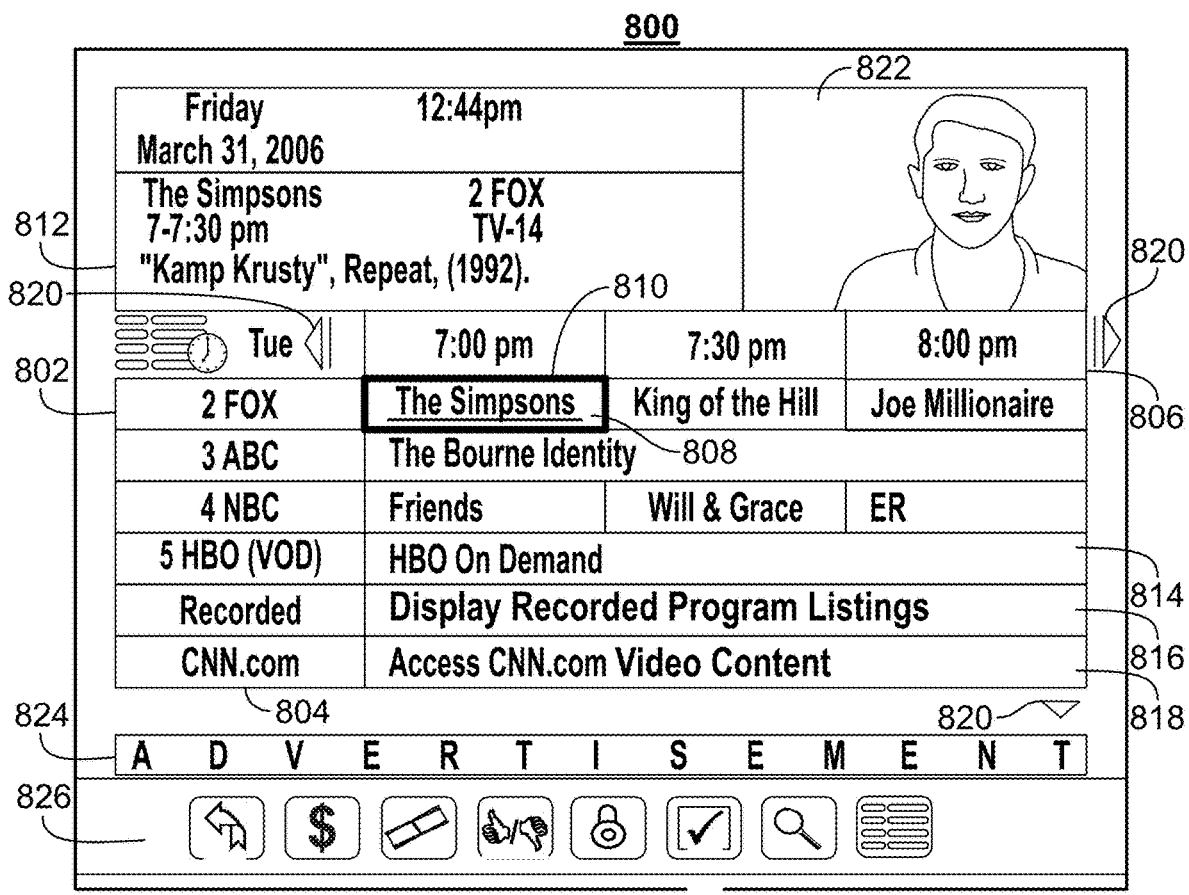
FIGS. 8-9 show other illustrative examples of display screens generated by a media guidance application in accordance with some embodiments of the disclosure.
Figure 9:
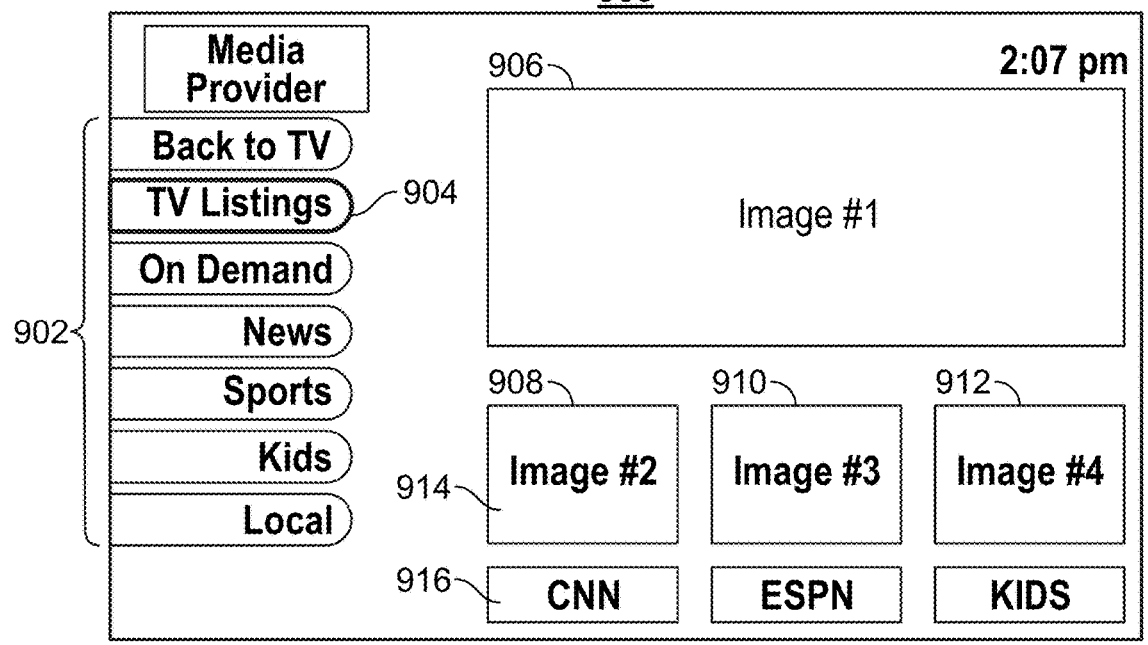

FIGS. 8-9 show illustrative display screens that may be used to provide media guidance data. The display screens shown in FIGS. 8-9 may be implemented on any suitable user equipment device or platform. While the displays of FIGS. 8-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 8 shows illustrative grid of a program listings display 800 arranged by time and channel that also enables access to different types of content in a single display. Display 800 may include grid 802 with: (1) a column of channel/content type identifiers 804, where each channel/content type identifier (which is a cell in the column) identifies a different channel or content type available; and (2) a row of time identifiers 806, where each time identifier (which is a cell in the row) identifies a time block of programming. Grid 802 also includes cells of program listings, such as program listing 808, where each listing provides the title of the program provided on the listing's associated channel and time. With a user input device, a user can select program listings by moving highlight region 810. Information relating to the program listing selected by highlight region 810 may be provided in program information region 812. Region 812 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include video region 822, and options region 826. Video region 822 may allow the user to view and/or preview programs that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 826 may allow the user to access different types of content, media guidance application displays, and/or media guidance application features. Options region 826 may be part of display 800 (and other display screens described herein), or may be invoked by a user by selecting an on-screen option or pressing a dedicated or assignable button on a user input device. The selectable options within options region 826 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 11. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 9. Video mosaic display 900 includes selectable options 902 for content information organized based on content type, genre, and/or other organization criteria. In display 900, television listings option 904 is selected, thus providing listings 906, 908, 910, and 912 as broadcast program listings. In display 900 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 908 may include more than one portion, including media portion 914 and text portion 916. Media portion 914 and/or text portion 916 may be selectable to view content in full-screen or to view information related to the content displayed in media portion 914 (e.g., to view listings for the channel that the video is displayed on).

The listings in display 900 are of different sizes (i.e., listing 906 is larger than listings 908, 910, and 912), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 10:
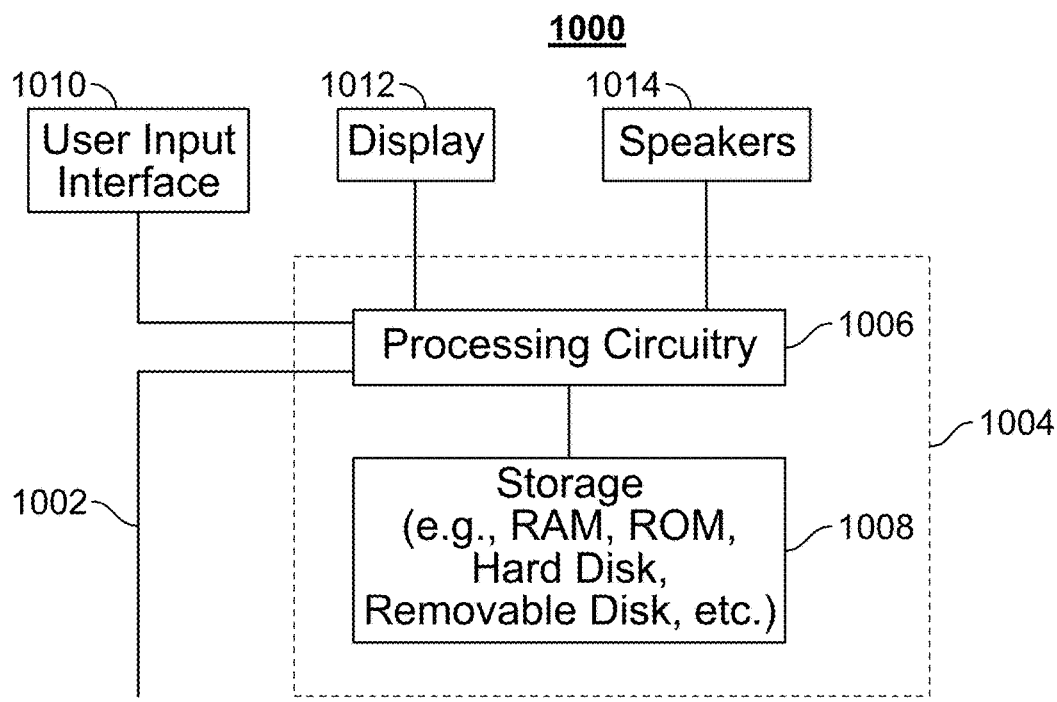
FIG. 10 is a block diagram of an illustrative user equipment device in accordance with some embodiments of the disclosure.

Users may access content and the media guidance application (and its display screens described above and below) from one or more of their user equipment devices. FIG. 10 shows a generalized embodiment of illustrative user equipment device 1000. More specific implementations of user equipment devices are discussed below in connection with FIG. 11. User equipment device 1000 may receive content and data via input/output (hereinafter "I/O") path 1002. I/O path 1002 may provide content (e.g., broadcast programming, on-demand programming, Internet content, content available over a local area network (LAN) or wide area network (WAN), and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for a media guidance application stored in memory (i.e., storage 1008). Specifically, control circuitry 1004 may be instructed by the media guidance application to perform the functions discussed above and below. For example, the media guidance application may provide instructions to control circuitry 1004 to generate the media guidance displays. In some implementations, any action performed by control circuitry 1004 may be based on instructions received from the media guidance application.

In client-server based embodiments, control circuitry 1004 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as media guidance data described above. Nonvolatile memory may also be used (e.g., to launch a boot-up routine and other instructions). Cloud-based storage, described in relation to FIG. 11, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of the user equipment 1000. Circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of user equipment device 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive media guidance application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014.

The guidance application may be implemented using any suitable architecture. For example, it may be a stand-alone application wholly-implemented on user equipment device 1000. In such an approach, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the media guidance application is a client-server based application. Data for use by a thick or thin client implemented on user equipment device 1000 is retrieved on-demand by issuing requests to a server remote to the user equipment device 1000. In one example of a client-server based guidance application, control circuitry 1004 runs a web browser that interprets web pages provided by a remote server. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to equipment device 1000 for presentation to the user.

In some embodiments, the media guidance application is downloaded and interpreted or otherwise run by an interpreter or virtual machine (run by control circuitry 1004). In some embodiments, the guidance application may be encoded in the ETV Binary Interchange Format (EBIF), received by control circuitry 1004 as part of a suitable feed, and interpreted by a user agent running on control circuitry 1004. For example, the guidance application may be an EBIF application. In some embodiments, the guidance application may be defined by a series of JAVA-based files that are received and run by a local virtual machine or other suitable middleware executed by control circuitry 1004. In some of such embodiments (e.g., those employing MPEG-2 or other digital media encoding schemes), the guidance application may be, for example, encoded and transmitted in an MPEG-2 object carousel with the MPEG audio and video packets of a program.

Figure 11:
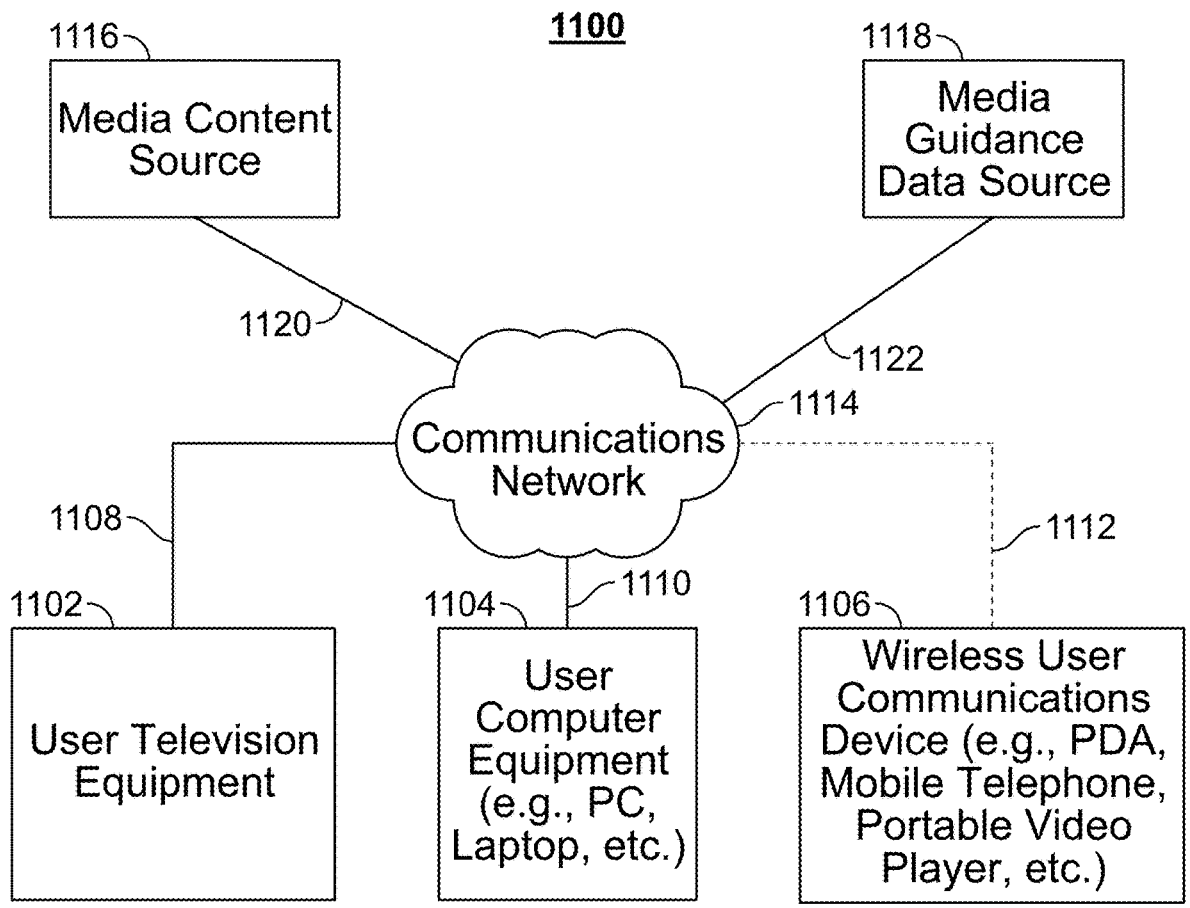
FIG. 11 is a block diagram of an illustrative media system in accordance with some embodiments of the disclosure.

User equipment device 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The media guidance application may have the same layout on various different types of user equipment or may be tailored to the display capabilities of the user equipment. For example, on user computer equipment 1104, the guidance application may be provided as a web site accessed by a web browser. In another example, the guidance application may be scaled down for wireless user communications devices 1106.

In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G or LTE network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1114.

System 1100 includes content source 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and media guidance data source 1118 may be exchanged over one or more communications paths, but are shown as a single path in FIG. 11 to avoid overcomplicating the drawing. In addition, there may be more than one of each of content source 1116 and media guidance data source 1118, but only one of each is shown in FIG. 11 to avoid overcomplicating the drawing. (The different types of each of these sources are discussed below.) If desired, content source 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or may not be the originator of content (e.g., an on-demand content provider, an Internet provider of content of broadcast programs for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1118 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1118 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1118 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1118 may provide user equipment devices 1102, 1104, and 1106 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 1008, and executed by control circuitry 1004 of a user equipment device 1000. In some embodiments, media guidance applications may be client-server applications where only a client application resides on the user equipment device, and server application resides on a remote server. For example, media guidance applications may be implemented partially as a client application on control circuitry 1004 of user equipment device 1000 and partially on a remote server as a server application (e.g., media guidance data source 1118) running on control circuitry of the remote server. When executed by control circuitry of the remote server (such as media guidance data source 1118), the media guidance application may instruct the control circuitry to generate the guidance application displays and transmit the generated displays to the user equipment devices. The server application may instruct the control circuitry of the media guidance data source 1118 to transmit data for storage on the user equipment. The client application may instruct control circuitry of the receiving user equipment to generate the guidance application displays.

Content and/or media guidance data delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1100 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 11.

In one approach, user equipment devices may communicate with each other within a home network. User equipment devices can communicate with each other directly via short-range point-to-point communication schemes described above, via indirect paths through a hub or other similar device provided on a home network, or via communications network 1114. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1116 to access content. Specifically, within a home, users of user television equipment 1102 and user computer equipment 1104 may access the media guidance application to navigate among and locate desirable content. Users may also access the media guidance application outside of the home using wireless user communications devices 1106 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more media guidance data sources 1118. In addition or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 12:
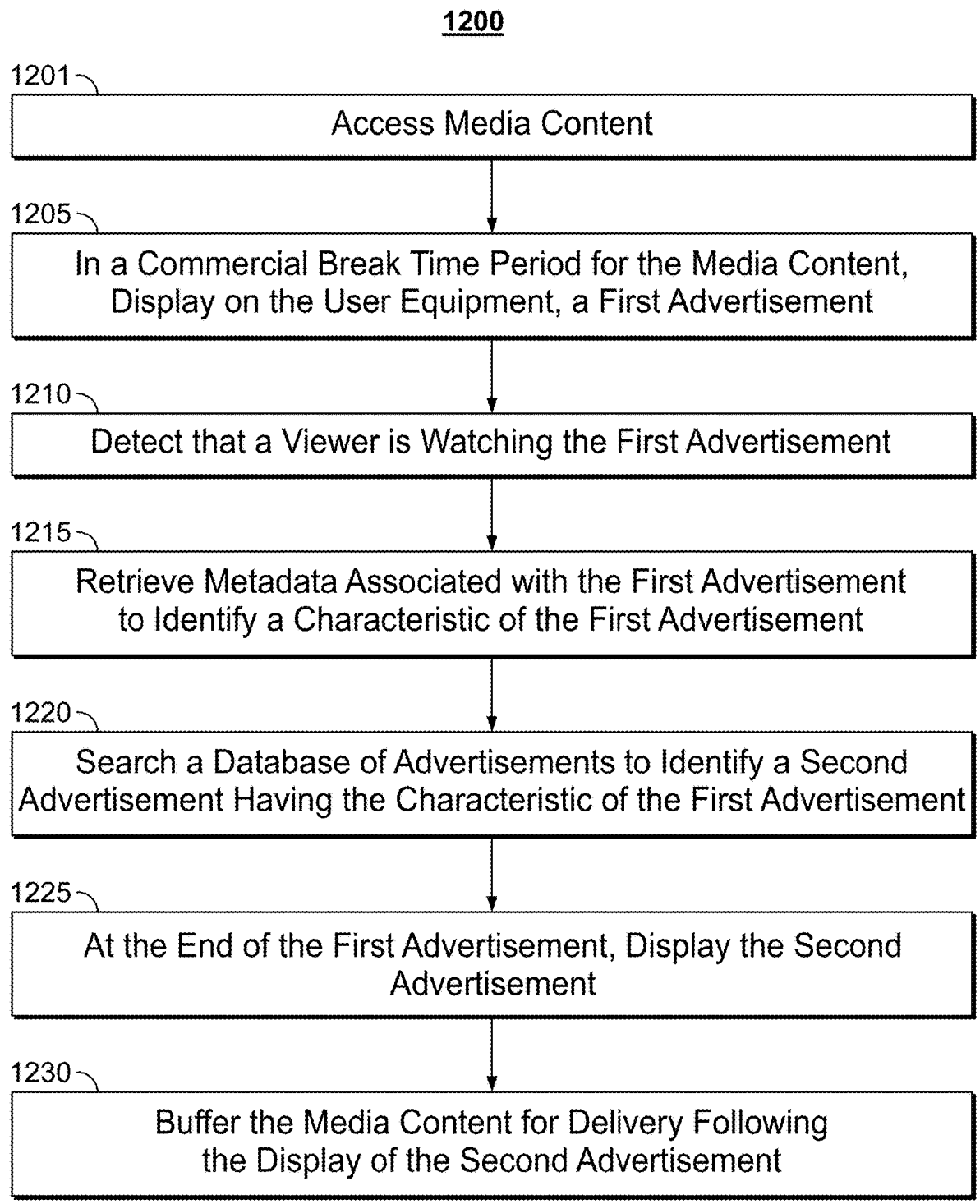
FIGS. 12-13 are flowcharts of illustrative processes for customizing an advertising display for a viewer in accordance with some embodiments of the disclosure.

FIG. 12 is a flowchart of illustrative steps of a process 1200 for customizing an advertising display in accordance with some embodiments of the disclosure. It should be noted that process 1200 or any step thereof could be performed on, or provided by, any of the devices shown in FIGS. 10-11. For example, process 1200 may be executed by control circuitry 1004 (FIG. 10) as instructed by a media guidance application implemented on a user device (e.g., user equipment devices 1102, 1104, and/or 1106 (FIG. 11)) to present a customized advertisement display. In addition, one or more steps of process 1200 may be incorporated into or combined with one or more steps of any other process or embodiment described herein.

FIG. 12 depicts steps in a process 1200 that may be used to customize an advertising display for a viewer. Process 1200 may begin with a viewer accessing media content with user equipment (e.g., user equipment devices 1102, 1104, and/or 1106 (FIG. 11)).

The media content may be any type of media content that the viewer may wish to view, such as on-demand media, or live broadcast media. The media content may have a commercial break time period (e.g., commercial break 614 (FIG. 6) or commercial break 720 (FIG. 7), in which one or more advertisements may be displayed for the viewer.

At step 1205, control circuitry 1004 for a media guidance application may be used to display on the user equipment a first advertisement. The media guidance application may monitor the viewer during the display of the media content and the advertisements displayed in the commercial break.

At step 1210, the media guidance application may detect that a viewer is watching the first advertisement. The detection of the viewer watching the first advertisement may be accomplished in one or more ways. For example, the viewer may not change a channel showing the advertisement. Such a lack of viewer interaction during an advertisement may indicate interest in the advertisement. In addition, control circuitry 1004 for the media guidance application may detect that the viewer is using another personal or household device to perform a search or activity that may be related to the advertisement. Such interaction may also indicate interest in the advertisement. Using an example of a vehicle advertisement, e.g., as shown in FIG. 1, a viewer may simply watch the advertisement and not interact with any devices, which could indicate that the viewer is paying close attention to the advertisement. Alternatively, the viewer may use a tablet to search for a report about the vehicle. In another example, the viewer may ask a home assistant device for a location of the closest car dealership. In another example, the viewer may send a message to a friend asking for advice about the vehicle. Any of these examples could potentially be monitored by a media guidance application and used as a basis for an indication of a viewer's interest in the advertisement.

If the control circuitry 1004 for the media guidance application detects that the viewer is watching the first advertisement, at step 1215, the control circuitry 1004 for the media guidance application may retrieve metadata associated with the first advertisement to identify the first advertisement. The control circuitry 1004 for the media guidance application may obtain time information for the advertisement (e.g., time 624 (FIG. 6)), so that that advertisement can be correctly identified. Then metadata for the advertisement may be obtained by the control circuitry 1004 for the media guidance application, and which may include various information and characteristics about the advertisement, e.g., product types, categories, target demographics, or other information (e.g., metadata 634 (FIG. 6)). The characteristics about the advertisement may be identified by the media guidance application. Given that there may be one or more characteristics about the advertisement, the media guidance application may need to select one or more of the characteristics. Using the vehicle advertisement example, the metadata for the advertisement may include a product type, automobile brand, target demographic, automobile features (e.g., touring, cargo capacity for adventure sports, family-oriented, speed, luxury, etc.) The media guidance application could check a user's preference profile or viewing history to determine whether any of such metadata characteristics may be particularly relevant to the viewer.

The selected characteristic may be used as a basis to find a second related advertisement. At step 1220, the control circuitry 1004 for the media guidance application may search a database of advertisements to identify a second advertisement having the characteristic of the first advertisement. For example, a viewer may watch a vehicle advertisement and when the media guidance application detects that the viewer is interested in the advertisement, the control circuitry 1004 for the media guidance application may search for a similar vehicle advertisement or a vehicle advertisement that has a feature that may appeal to the viewer.

At step 1225, the control circuitry 1004 for the media guidance application may then display the second advertisement at a time following the end of the first advertisement. The second advertisement may be displayed immediately following the first advertisement, or at another time following the first advertisement. Displaying two related advertisements may have a greater impact on the viewer.

Since the addition of the second advertisement may cause a timing issue for delivery of the media content, at step 1230, the control circuitry 1004 for the media guidance application may buffer, to a media cache, the media content for a period corresponding to the second advertisement. Thus, when the viewer returns to viewing the media content, the viewer will not miss any of the media content that may have overlapped with the extended time of the commercial break time period that has added an additional advertisement.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 12.

Figure 13:
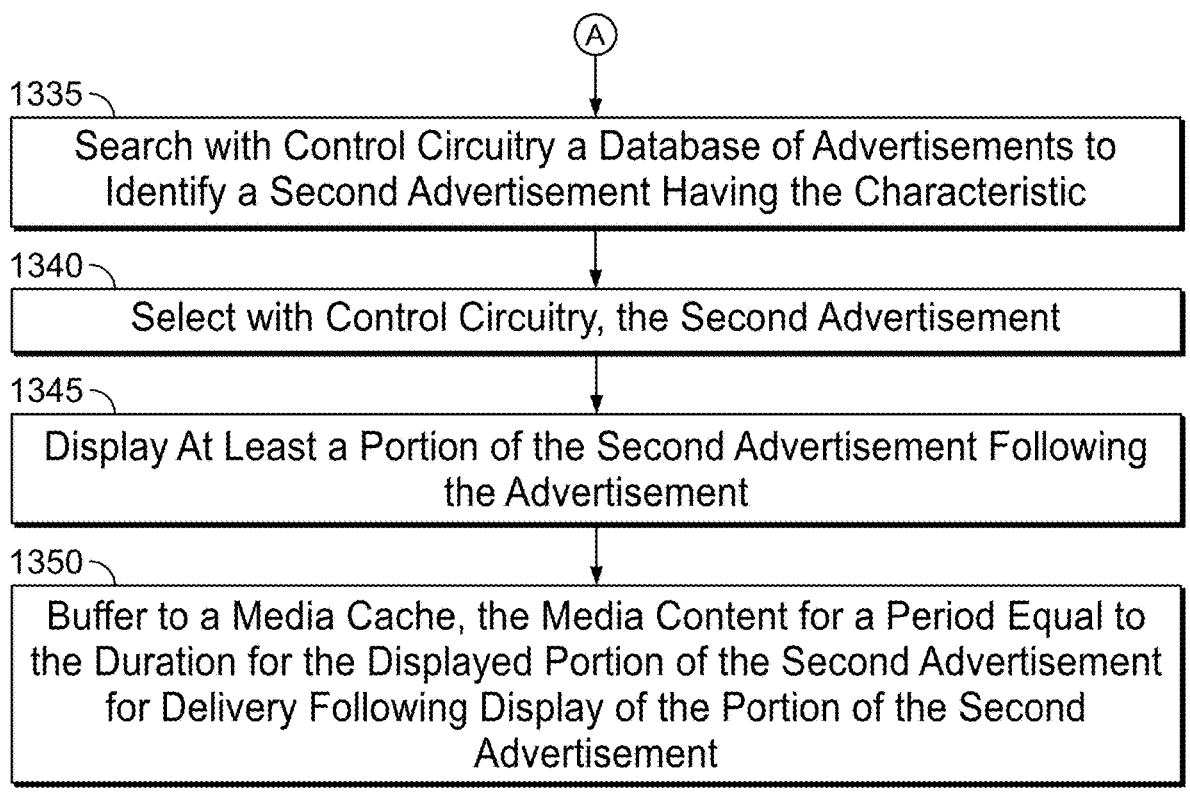

FIG. 13 is a flowchart of illustrative steps of a process 1300 for customizing an advertising display in accordance with some embodiments of the disclosure. It should be noted that process 1300 or any step thereof could be performed on, or provided by, any of the devices shown in FIGS. 10-11. For example, process 1300 may be executed by control circuitry 1004 (FIG. 10) as instructed by a media guidance application implemented on a user device (e.g., user equipment devices 1102, 1104, and/or 1106 (FIG. 11)) to present a customized advertisement display. In addition, one or more steps of process 1300 may be incorporated into or combined with one or more steps of any other process or embodiment described herein.

FIG. 13 depicts steps in a process 1300 that may be used to customize an advertising display for a viewer. Process 1300 may begin with a viewer accessing with control circuitry media content with user equipment (e.g., user equipment devices 1102, 1104, and/or 1106 (FIG. 11)). The media content may be any type of media content that the viewer may wish to view, such as on-demand media, or live broadcast media. The media content may have a commercial break time period (e.g., commercial break 614 (FIG. 6) or commercial break 720 (FIG. 7)), in which one or more advertisements may be displayed for the viewer.

At step 1305, control circuitry 1004 for a media guidance application may be used to determine a commercial break timestamp for a commercial break time period and respective timestamps for a plurality of advertisements to be shown in the commercial break time period. The timestamp information may be obtained from a media record, e.g., record 600 (FIG. 6), which may include timestamp 624 (FIG. 6) and advertisement metadata 634 (FIG. 6).

At step 1310, control circuitry 1004 for a media guidance application may be used to display on the user equipment an advertisement of the plurality of advertisements in the commercial break. The media guidance application may monitor the viewer during the display of the media content and the advertisements displayed in the commercial break.

At step 1315, the media guidance application may detect that a viewer is watching one of the advertisements. The detection of the viewer watching the advertisement may be accomplished in one or more ways. For example, the viewer may not change a channel showing the advertisement. Such a lack of viewer interaction during an advertisement may indicate interest in the advertisement. In addition, control circuitry 1004 for the media guidance application may detect that the viewer is using another personal or household device to perform a search or activity that may be related to the advertisement. Such interaction may also indicate interest in the advertisement. Using an example of a vehicle advertisement, e.g., as shown in FIG. 1, a viewer may simply watch the advertisement and not interact with any devices, which could indicate that the viewer is paying close attention to the advertisement. Alternatively, the viewer may use a tablet to search for a report about the vehicle. In another example, the viewer may ask a household assistant device for a location of the closest car dealership. In another example, the viewer may send a message to a friend asking for advice about the vehicle. Any of these examples could potentially be monitored by a media guidance application and used as a basis for an indication of a viewer's interest in the advertisement.

If the control circuitry 1004 for the media guidance application detects that the viewer is watching the advertisement, at step 1320, the control circuitry 1004 for the media guidance application determines a time that the viewer is watching the advertisement. Such determination may be made by recording the watch time.

At step 1325, the control circuitry 1004 for a media guidance application may use the advertising time information (e.g., time 624 (FIG. 6)) to identify which of the advertisements is being viewed by the viewer at the watch time.

At step 1330, the control circuitry 1004 for a media guidance application may retrieve metadata associated with the advertisement to obtain various types of information and characteristics about the advertisement, e.g., product types, categories, target demographics, or other information (e.g., metadata 634 (FIG. 6)). The characteristics about the advertisement may be identified by the media guidance application. Given that there may be one or more characteristics about the advertisement, the media guidance application may need to select one or more of the characteristics. Using the vehicle advertisement example, the metadata for the advertisement may include a product type, automobile brand, target demographic, automobile features (e.g., touring, cargo capacity for adventure sports, family-oriented, speed, luxury, etc.) The media guidance application could check a user's preference profile or viewing history to determine whether any of such metadata characteristics may be particularly relevant to the viewer.

The selected characteristic may be used as a basis to find a second related advertisement. At step 1335, the control circuitry 1004 for the media guidance application may search a database of advertisements to identify a second advertisement having the characteristic of the advertisement. For example, a viewer may watch a vehicle advertisement and when the media guidance application detects that the viewer is interested in the advertisement, the control circuitry 1004 for the media guidance application may search for a similar vehicle advertisement or a vehicle advertisement that has a feature that may appeal to the viewer.

At step 1340, the control circuitry 1004 for the media guidance application may select the second advertisement.

At step 1345, the control circuitry 1004 for a media guidance application may display the second advertisement at a time following the end of the advertisement. The second advertisement may be displayed immediately following the advertisement, or at another time following the advertisement. Displaying two related advertisements may have a greater impact on the viewer. The second advertisement may be displayed in whole or in part.

Since the addition of the second advertisement may cause a timing issue for delivery of the media content, at step 1350, the control circuitry 1004 for the media guidance application may buffer, to a media cache, the media content for a period corresponding to the second advertisement. Thus, when the viewer returns to viewing the media content, the viewer will not miss any of the media content that may have overlapped with the extended time of the commercial break time period that has added an additional advertisement.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 13.

Selection of the second advertisement may involve several considerations. Ideally, the second advertisement should only be used if it is a relatively high-quality advertisement. For example, the second advertisement may be selected from a pool of advertisements that are likely to be interesting to the viewer. Thus, the second advertisement may be obtained from a database of advertisements that are, for example, advertisements associated with a contact in the viewer's social network, advertisements recommended by a contact in the viewer's social network, advertisements associated with a geographical region associated with the viewer, or advertisements having a certain popularity metric. Such a database may be constructed by the media guidance application and updated periodically so that the most current and best advertisements are used.

In addition, to avoid supplying a second advertisement when a viewer is not actually viewing an advertisement, but has been detected by the media guidance application as performing an activity that may indicate interest in an advertisement, the media guidance application may first check that the advertisement is one that would likely be interesting to the viewer. Thus, before the second advertisement search commences, the media guidance application may search an advertising database to determine whether the viewed advertisement is one that is relatively popular. In addition, the media guidance application may check metadata about the advertisement and compare it to a user's profile to determine whether there is overlap in categories of the user's interest and the subject of the advertisement.

Figure 14:
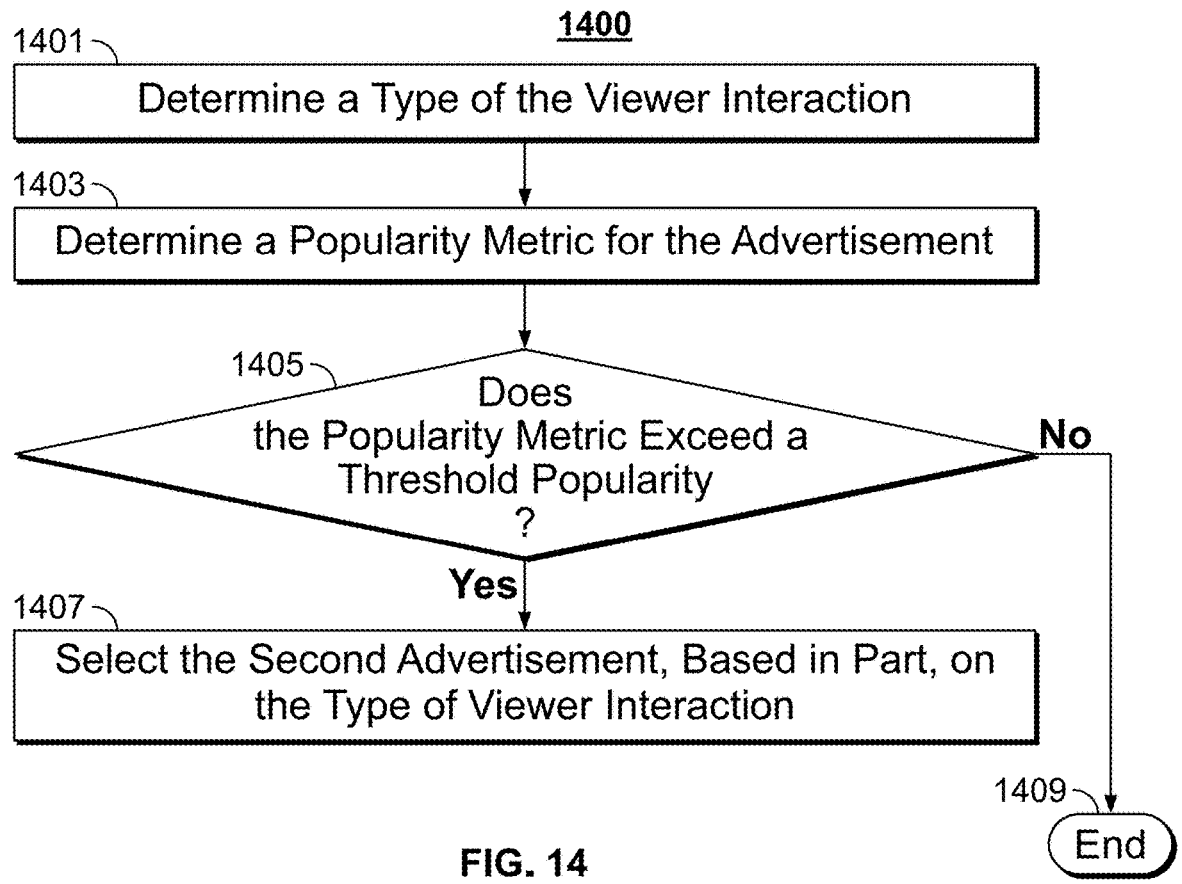
FIG. 14 is a flowchart of an illustrative process for selecting a second advertisement in accordance with some embodiments of the disclosure.

FIG. 14 is a flowchart of illustrative steps of a process 1400 for customizing an advertising display in accordance with some embodiments of the disclosure. It should be noted that process 1400 or any step thereof could be performed on, or provided by, any of the devices shown in FIGS. 10-11. For example, process 1400 may be executed by control circuitry 1004 (FIG. 10) as instructed by a media guidance application implemented on a user device (e.g., user equipment devices 1102, 1104, and/or 1106 (FIG. 11)) to present a customized advertisement display. In addition, one or more steps of process 1400 may be incorporated into or combined with one or more steps of any other process or embodiment described herein.

Another factor for consideration in the selection of a second advertisement may be a type of viewer interaction. FIG. 14 depicts steps of a process 1400 that may be followed for selecting the second advertisement. As discussed herein, a media guidance application may monitor a viewer's viewing activity to detect whether a viewer is watching an advertisement. At step 1401, control circuitry 1004 for the media guidance application may identify a type of viewer interaction that is used to indicate that the viewer is watching an advertisement. Types of viewer interactions may be, for example, that the viewer does nothing, or that the viewer uses the media guidance application or other device to seek information about something related to the advertisement. Such a type of viewer interaction may have associated relevance for finding a related advertisement.

In order to be sure that a lack of viewer interactions at a time that an advertisement is displayed is not misinterpreted as interest in the advertisement when, in fact, the viewer is simply not viewing the advertisement, the control circuitry 1004 for the media guidance application may determine a popularity metric for the advertisement at step 1403. The popularity metric may be obtained by the control circuitry 1004 for the media guidance application from an advertisement database, or media ratings source to determine whether the advertisement has, generally speaking, been rated favorably.

A popularity rating threshold may be established by the media guidance application for use in connection with the features described herein so that only certain relatively popular or interesting advertisements can be a basis for finding additional advertising. This can be helpful when the viewer interactions used as a basis for determining interest are a lack of interactions. The popularity rating threshold may be compared at step 1405 by the control circuitry 1004 for the media guidance application against the determined popularity metric for the advertisement.

If the popularity metric for the advertisement exceeds the threshold popularity, at step 1407, the control circuitry 1004 for the media guidance application may use the viewer interaction type as a basis for selecting a second advertisement. In an example, if the viewer is watching a vehicle advertisement and the viewer posts to social media about driving a car to an event, the media guidance application may determine that another vehicle advertisement may be relevant, in particular a vehicle that is suitable for a road trip. Alternatively, if the viewer, when watching a vehicle advertisement, searches on a tablet for cargo dimensions or seat capacity in a vehicle, the media guidance application may select a vehicle advertisement for a suitably sized vehicle. If there are no viewer interactions detected, and the media guidance application determines that the viewer is watching the advertisement, the media guidance application may search for a second advertisement that is related to a broad category of the advertisement and also one that has overlapping characteristics with a user preference profile, shopping history, or other user information. These examples are meant to be illustrative and can be used in combination to supply the best second advertisement for a viewer.

If the control circuitry 1004 for the media guidance application determines at step 1405 that the popularity metric for the advertisement does not exceed the threshold popularity, the process 1400 may end at step 1409 and the media guidance application may continue monitoring the viewer for interactions that may indicate a user's interest in an advertisement.

In some scenarios, affirmative or active interactions with or related to an advertisement may be proof of interest in the advertisement, and in such cases, steps 1403 and 1405 may be optionally omitted.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 14.

Figure 15:
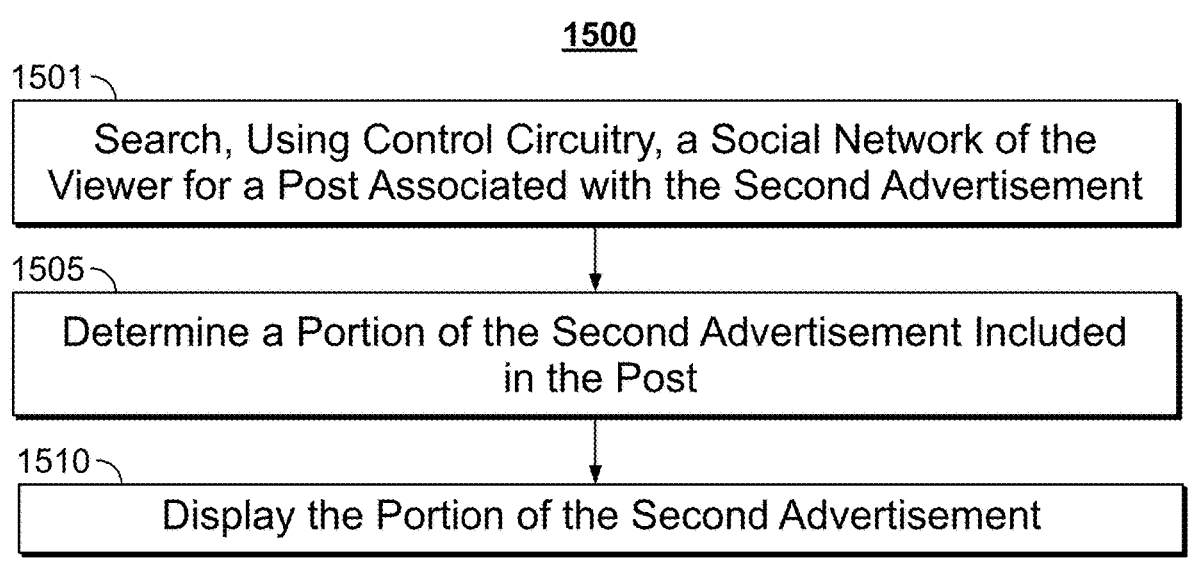
FIGS. 15-17 are flowcharts of illustrative processes for displaying a second advertisement in accordance with some embodiments of the disclosure.

FIG. 15 is a flowchart of illustrative steps of a process 1500 for determining a portion of a second advertisement to display to a viewer in accordance with some embodiments of the disclosure. It should be noted that process 1500 or any step thereof could be performed on, or provided by, any of the devices shown in FIGS. 10-11. For example, process 1500 may be executed by control circuitry 1004 (FIG. 10) as instructed by a media guidance application implemented on a user device (e.g., user equipment devices 1102, 1104, and/or 1106 (FIG. 11)) to present a customized advertisement display. In addition, one or more steps of process 1500 may be incorporated into or combined with one or more steps of any other process or embodiment described herein.

In some scenarios, it may be appropriate to show only a portion of a second advertisement to a viewer. Since it could be annoying to the viewer to watch additional advertising, supplying only the most high-impact elements of a relevant advertisement may be the best way to accomplish advertising to the viewer without irritating the viewer. FIG. 15 shows steps of a process 1500 for determining a portion of an advertisement to display to the viewer.

At step 1501, control circuitry 1004 for a media guidance application may search a social network of the viewer, including extended networks—friends of friends, neighbors, etc.—to find any instances of the second advertisement. The second advertisement could appear, for example, in a friend's post, in a shared post, or other post. In some scenarios, the control circuitry 1004 for the media guidance application may not find any instances of the second advertisement. In this case, the control circuitry 1004 for the media guidance application may optionally search an advertising database to see whether clips of the second advertisement exist.

If, however, the control circuitry 1004 for the media guidance application locates a post in the viewer's social media, at step 1505, the control circuitry 1004 for the media guidance application may determine whether a portion of the second advertisement was included in the post. Such determination may involve comparing time information obtained from metadata for the second advertisement and time details in the post. Data size could also be used to determine whether a shorter version of the second advertisement was used in the post.

If only a portion of the second advertisement was used in the post, at step 1510, the control circuitry 1004 for the media guidance application may select the same portion for display to the viewer. Thus, in a vehicle advertisement example, if a friend posted a shorter clip of just a portion of the advertisement or just an image from the advertisement, such version or portions of the advertisement may be used by the control circuitry 1004 for the media guidance application for display to the viewer.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 15.

Figure 16:
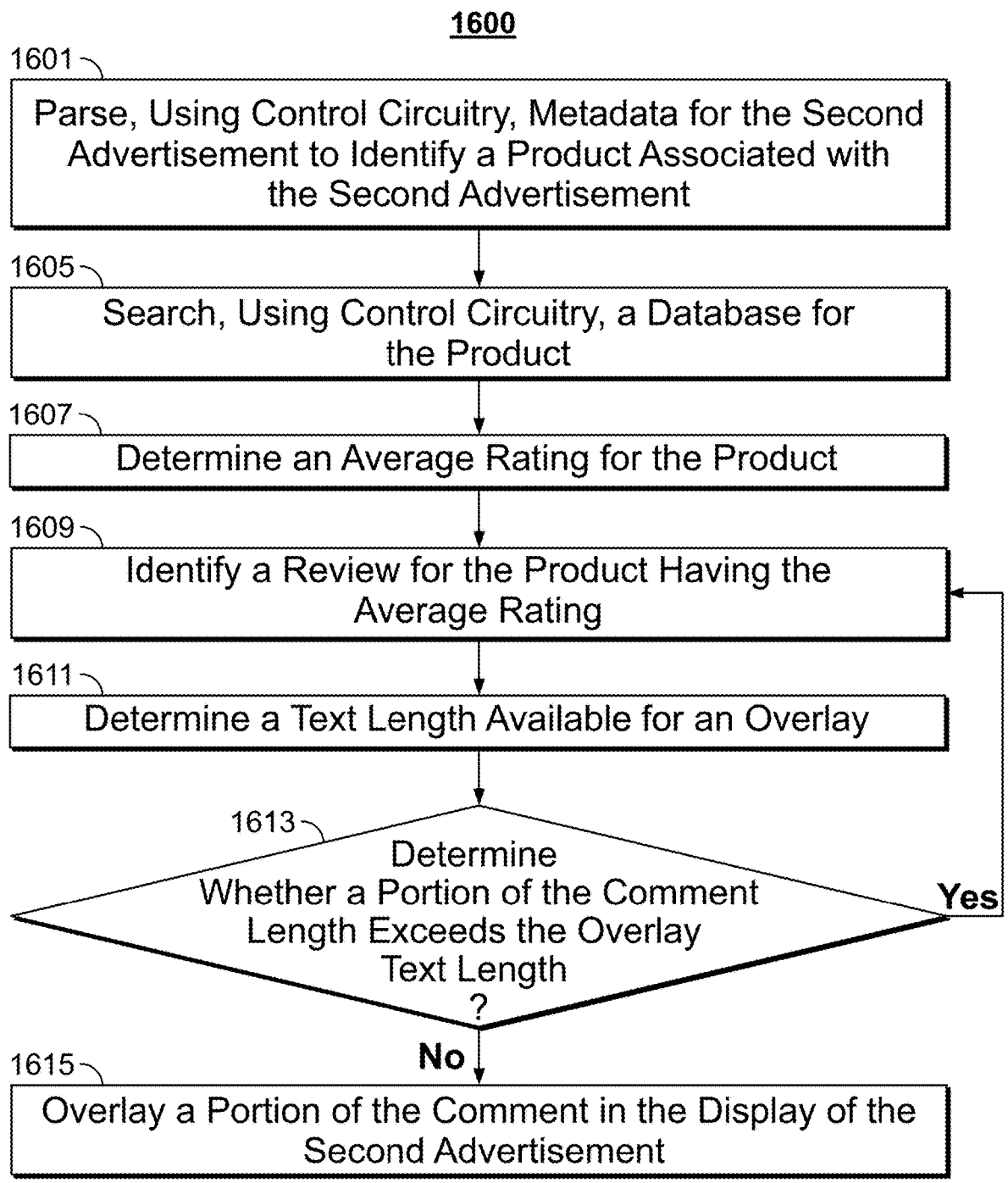

FIG. 16 is a flowchart of illustrative steps of a process 1600 for customizing an overlay of the second advertisement in accordance with some embodiments of the disclosure. It should be noted that process 1600 or any step thereof could be performed on, or provided by, any of the devices shown in FIGS. 10-11. For example, process 1600 may be executed by control circuitry 1004 (FIG. 10) as instructed by a media guidance application implemented on a user device (e.g., user equipment devices 1102, 1104, and/or 1106 (FIG. 11)) to present a customized advertisement display. In addition, one or more steps of process 1600 may be incorporated into or combined with one or more steps of any other process or embodiment described herein.

FIG. 16 depicts steps of a process 1600 for customizing an overlay for a second advertisement. At step 1601, control circuitry 1004 for a media guidance application may parse metadata for the second advertisement to obtain product information about the second advertisement. The metadata for the second advertisement may include information about a product type, target demographic, product features, geographic reach, and other metadata. The metadata obtained at step 1601 may be used to identify a product associated with the second advertisement.

An overlay for the second advertisement may include details about the product. For example, at step 1605, the control circuitry 1004 for the media guidance application may search a database for the identified product. Examples of a search for a vehicle advertisement may be a car dealer review, or consumer reports reviews for the vehicle. In another example, the product may be searched in the viewer's social network to determine whether there have been any instances of posts involving the product name or category.

At step 1607, the control circuitry 1004 for the media guidance application may determine an average rating for the product. The average rating may be, for example, based on a five-star scale, and so an average of ratings may be 3 or 4 stars of out 5. The average rating may be used as a basis for finding an average review. An average review may be one that is relatively more balanced or fair than one that assigns a significantly lower or higher rating.

Thus, at step 1609, the average rating may be used by the control circuitry 1004 for the media guidance application to identify a review for the product that has the average rating. The media guidance application may search the reviews in the database and select one or more that have ratings that are similar to the average rating.

The reviews may also be selected by the control circuitry 1004 for the media guidance application based on reviews having a particular relevance or connection to the viewer. For example, friends' comments may be selected when they are friends that have a high number of interactions with the viewer in a social media context. In another example, a viewer's geographic location may be used to select comments posted in a product review database. In another example, a viewer's preference profile may indicate types of interests that may overlap with a comment. In each of these scenarios, a review having a rating similar to the average rating for the product may be deemed more reliable and suitable for use in an overlay.

At step 1611, the control circuitry 1004 for the media guidance application may determine a text length that is available for an advertisement overlay. The text length may vary, and can be based on a size of the screen showing the media content. The text length may also vary based on a user's preference for text size in screen displays.

At decision 1613, the control circuitry 1004 for the media guidance application may determine whether a comment or some portion of the comment in the review or reviews identified at step 1609 exceeds the overlay text length. If the length of the comment exceeds the available text length for the overlay, the process 1600 may continue at step 1609 to identify additional reviews that may be used.

If the comment length is determined to be within the constraints of the text length available for the overlay, the control circuitry 1004 for the media guidance application may select, at step 1615 the selected comment, or a portion of the selected comment to overlay the display of the second advertisement. Thus, the display of the second advertisement may look like the screens shown in FIGS. 2-3 which include customized overlays 230 (FIG. 2) and 330 (FIG. 3).

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 16.

Figure 17:
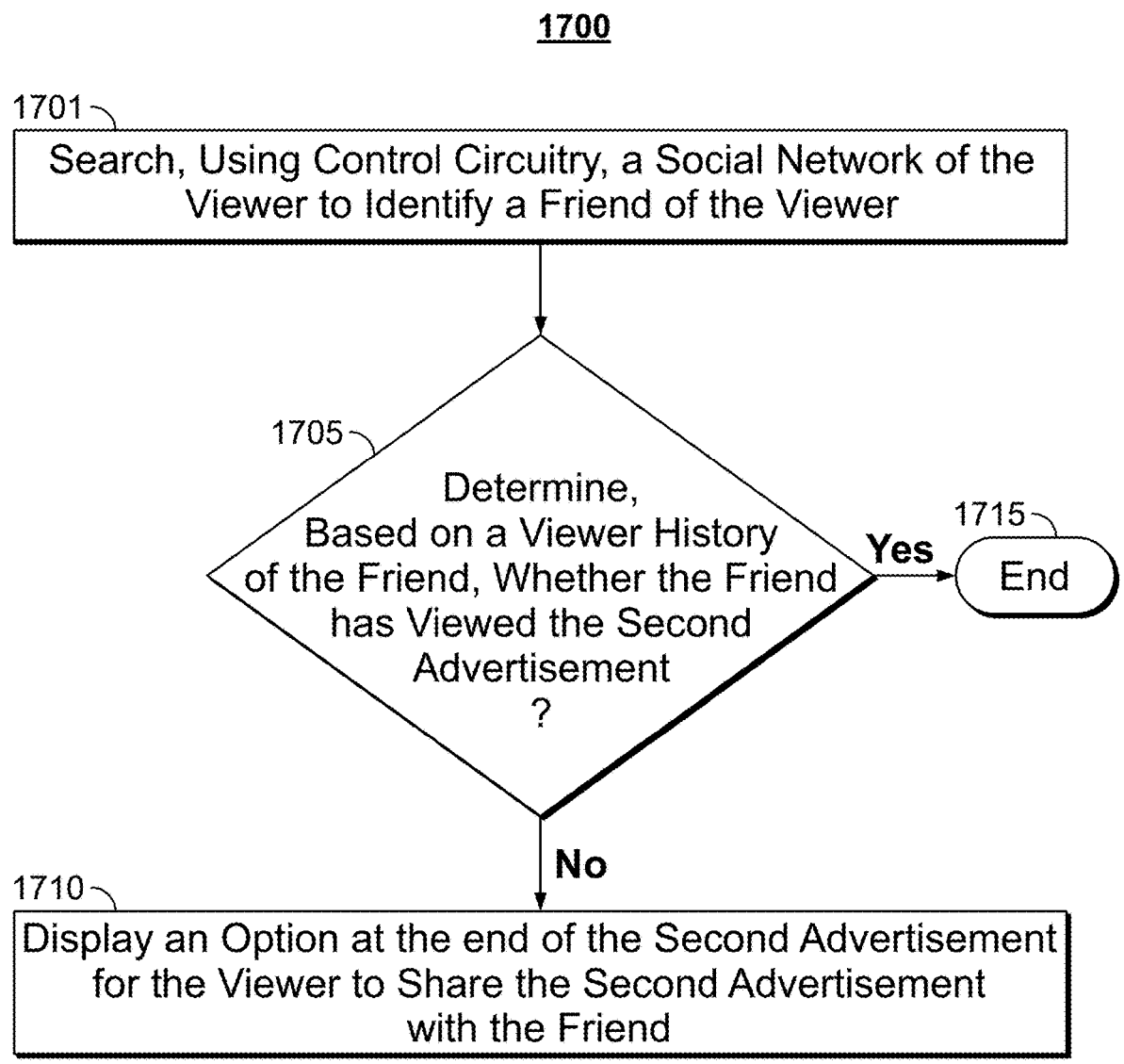

FIG. 17 is a flowchart of illustrative steps of a process 1700 for sharing an advertisement in accordance with some embodiments of the disclosure. It should be noted that process 1700 or any step thereof could be performed on, or provided by, any of the devices shown in FIGS. 10-11. For example, process 1700 may be executed by control circuitry 1004 (FIG. 10) as instructed by a media guidance application implemented on a user device (e.g., user equipment devices 1102, 1104, and/or 1106 (FIG. 11)) to present a customized advertisement display. In addition, one or more steps of process 1700 may be incorporated into or combined with one or more steps of any other process or embodiment described herein.

Some viewers enjoy sharing advertisements with friends. To facilitate sharing of advertisements, a media guidance application may supply a selectable option (e.g., in an overlay 430 (FIG. 4)) to the viewer to share an advertisement. The option may be supplied following the steps of process 1700.

At step 1701, the control circuitry 1004 for the media guidance application may search a social network of the viewer to identify a friend of the viewer. Ideally, the friend will be one that has frequent sharing interactions with the viewer. In addition, the friend may be one that has an interest in a category of a product associated with the advertisement. Such interest may be determined using a friend's user preference profile, for example.

At step 1705, the control circuitry 1004 for the media guidance application may check the friend's viewing history to determine whether the friend has viewed the advertisement.

If the friend has not viewed the advertisement, at step 1710, the control circuitry 1004 for the media guidance application may generate an overlay for the second advertisement that includes a selectable option to share the advertisement with the friend (e.g., the share option overlay 430 (FIG. 4)).

If the friend has viewed the advertisement, the process may end.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 17.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method comprising:
    parsing metadata for a media item to obtain product information about the media item;
    searching a database for a product associated with the media item based on the product information;
    determining an average rating of the product;
    obtaining a first review for the product corresponding to the average rating from the database; and
    overlaying a portion of the first review in a display of the media item without receiving a user input.

2. The method of claim 1, wherein the metadata comprises information for at least one of a product category, a product name, product features, target audience of the media item, or a geographic reach.

3. The method of claim 1, wherein searching the database for the product comprises searching a social network of a viewer of the media item for a post associated with the media item.

4. The method of claim 1, wherein the average rating is within a predetermined range of ratings, and wherein the first review for the product has the average rating.

5. The method of claim 1, further comprising:
    parsing a social network of a viewer of the media item to identify a connection of the viewer;
    determining that a number of interactions between the connection and the viewer is above a threshold; and
    selecting a review from the connection as the first review based on the determination that the number of interactions between the connection and the viewer is above the threshold.

6. The method of claim 1, wherein obtaining the first review is based on a geographic location of the viewer.

7. The method of claim 1, further comprising:
    determining a text length available for an overlay over the media item; and
    determining whether the portion of the first review exceeds the text length available for the overlay.

8. The method of claim 7, further comprising:
    upon determining that the portion of the first review exceeds the text length available for the overlay, obtaining a second review for the product based on the average rating that is different from the first review.

9. The method of claim 7, wherein overlaying the portion of the first review in the display of the media item is based on determining that the portion of the first review does not exceed the text length available for the overlay.

10. The method of claim 7, wherein the text length is determined based on at least one of a screen size of a device displaying the media item or user preference data for a text size.

11. A system comprising:
    control circuitry configured to:
        parse metadata for a media item to obtain product information about the media item;
        search a database for a product associated with the media item based on the product information;
        determine an average rating of the product;
        obtain a first review for the product corresponding to the average rating from the database; and
        overlay a portion of the first review in a display of the media item without receiving a user input.

12. The system of claim 11, wherein the metadata comprises information for at least one of a product category, a product name, product features, target audience of the media item, or a geographic reach.

13. The system of claim 11, wherein the control circuitry, when searching the database for the product, is configured to search a social network of a viewer of the media item for a post associated with the media item.

14. The system of claim 11, wherein the average rating is within a predetermined range of ratings, and wherein the first review for the product has the average rating.

15. The system of claim 11, wherein the control circuitry is further configured to:
    parse a social network of a viewer of the media item to identify a connection of the viewer;
    determine that a number of interactions between the connection and the viewer is above a threshold; and
    select a review from the connection as the first review based on the determination that the number of interactions between the connection and the viewer is above the threshold.

16. The system of claim 11, wherein obtaining the first review is based on a geographic location of the viewer.

17. The system of claim 11, wherein the control circuitry is further configured to:
    determine a text length available for an overlay over the media item; and
    determine whether the portion of the first review exceeds the text length available for the overlay.

18. The system of claim 17, wherein the control circuitry is further configured to:
    upon determining that the portion of the first review exceeds the text length available for the overlay, obtain a second review for the product based on the average rating that is different from the first review.

19. The system of claim 17, wherein overlaying the portion of the first review in the display of the media item is based on determining that the portion of the first review does not exceed the text length available for the overlay.

20. The system of claim 17, wherein the text length is determined based on at least one of a screen size of a device displaying the media item or user preference data for a text size.

* * * * *